United States Patent
Kim et al.

(10) Patent No.: US 12,180,634 B2
(45) Date of Patent: Dec. 31, 2024

(54) WASHING APPARATUS AND METHOD FOR CONTROLLING SAME

(71) Applicant: LG Electronics Inc., Seoul (KR)

(72) Inventors: Changoh Kim, Seoul (KR); Seulgi Park, Seoul (KR); Sangwook Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 1100 days.

(21) Appl. No.: 16/971,881

(22) PCT Filed: Feb. 20, 2019

(86) PCT No.: PCT/KR2019/002040
§ 371 (c)(1),
(2) Date: Aug. 21, 2020

(87) PCT Pub. No.: WO2019/164244
PCT Pub. Date: Aug. 29, 2019

(65) Prior Publication Data
US 2021/0087734 A1    Mar. 25, 2021

(30) Foreign Application Priority Data

Feb. 22, 2018  (KR) .......................... 10-2018-0021233
May 3, 2018   (KR) .......................... 10-2018-0050965
Oct. 16, 2018 (KR) .......................... 10-2018-0123453

(51) Int. Cl.
*D06F 33/36*    (2020.01)
*D06F 39/04*    (2006.01)
*D06F 39/08*    (2006.01)

(52) U.S. Cl.
CPC .............. *D06F 33/36* (2020.02); *D06F 39/04* (2013.01); *D06F 39/08* (2013.01)

(58) Field of Classification Search
CPC .............. D06F 33/00; D06F 33/30–36; D06F 33/44–46; D06F 33/50–56;
(Continued)

(56) References Cited

U.S. PATENT DOCUMENTS 4,181,846 A         1/1980  Cunningham
2004/0244433 A1 *  12/2004  Lee .................... D06F 39/087
                                              68/12.13
(Continued)

FOREIGN PATENT DOCUMENTS

CN    107012652 A  *  8/2017  ............ D06F 33/00
DE    102008043281     5/2010
(Continued)

OTHER PUBLICATIONS

Office Action in Korean Appln. No. 10-2018-0050965, dated Sep. 17, 2022, 11 pages (with English translation).
(Continued)

*Primary Examiner* — Spencer E. Bell
*Assistant Examiner* — Omair Chaudhri
(74) *Attorney, Agent, or Firm* — Fish & Richardson P.C.

(57) ABSTRACT

Provided is a washing apparatus equipped with an induction heater to heat a drum and a method of controlling the washing apparatus. The method includes a water supply step of supplying washing water to the tub via a water valve, a soaking step of soaking laundry by driving the drum while circulating washing water with the circulation pump after the water supply step ends, a heating step of heating the drum by driving the induction module after the soaking step ends, and a main washing step of washing the laundry by driving the drum after the heating step ends, wherein in the heating step, a water level is below a lower end of the drum, and the drum, the circulation pump, and the induction
(Continued)

module are driven to operate, thereby heating the drum, the washing water, and the laundry.

27 Claims, 11 Drawing Sheets

(58) Field of Classification Search
CPC .... D06F 33/70–72; D06F 39/04; D06F 39/08; D06F 39/083–085; D06F 39/087–088
See application file for complete search history.

(56) References Cited

U.S. PATENT DOCUMENTS

| | | | |
|---|---|---|---|
| 2005/0028295 A1* | 2/2005 | Jeon | D06F 33/46 8/158 |
| 2006/0010613 A1* | 1/2006 | Jeon | D06F 39/008 8/158 |
| 2006/0107468 A1* | 5/2006 | Urbanet | D06F 39/083 8/158 |
| 2008/0034809 A1 | 2/2008 | Bang et al. | |
| 2008/0134445 A1 | 6/2008 | Cho et al. | |
| 2008/0201867 A1* | 8/2008 | Bang | D06F 33/34 68/12.03 |
| 2008/0271754 A1* | 11/2008 | Park | D06F 33/47 8/158 |
| 2009/0013729 A1* | 1/2009 | Park | D06F 39/088 68/16 |
| 2009/0272155 A1 | 11/2009 | Jeong et al. | |
| 2010/0011514 A1* | 1/2010 | Park | D06F 34/18 8/159 |
| 2011/0099730 A1* | 5/2011 | Im | D06F 33/36 8/137 |
| 2011/0099732 A1* | 5/2011 | Im | D06F 33/36 8/137 |
| 2011/0126360 A1* | 6/2011 | Cho | D06F 35/006 8/137 |
| 2011/0179584 A1* | 7/2011 | Kim | D06F 37/40 8/137 |
| 2013/0081431 A1* | 4/2013 | Hill | D06F 39/083 68/12.12 |
| 2013/0200834 A1* | 8/2013 | Kim | D06F 35/005 318/445 |
| 2014/0033449 A1* | 2/2014 | Im | D06F 33/34 8/137 |
| 2014/0250607 A1* | 9/2014 | Favaro | D06F 33/36 8/137 |
| 2015/0354122 A1* | 12/2015 | Kwon | D06F 29/02 8/137 |
| 2017/0226680 A1* | 8/2017 | Driussi | D06F 39/088 |

FOREIGN PATENT DOCUMENTS

| | | | | |
|---|---|---|---|---|
| DE | 10-2009-026646 | | 12/2010 | |
| DE | 102009026646 A1 | * | 12/2010 | ............. D06F 25/00 |
| DE | 102016110859 | | 6/2017 | |
| DE | 102016110871 | | 11/2017 | |
| EP | 0726349 | | 10/2001 | |
| EP | 726349 B1 | * | 10/2001 | ........... D06F 35/006 |
| EP | 1961854 | | 8/2008 | |
| EP | 2025795 | | 2/2009 | |
| EP | 2578736 | | 4/2013 | |
| EP | 2781640 A1 | * | 9/2014 | ............. D06F 33/02 |
| EP | 1831447 B1 | * | 10/2014 | ........... D06F 35/006 |
| EP | 2792782 | | 10/2014 | |
| EP | 2930262 | | 10/2015 | |
| EP | 3246451 | | 11/2017 | |
| EP | 3246451 A1 | * | 11/2017 | ............. D06F 33/36 |
| GB | 2183809 A | * | 6/1987 | ............. D06F 34/08 |
| JP | 2004313793 | | 11/2004 | |
| JP | 2011206143 | | 10/2011 | |
| JP | 2012-030002 | | 2/2012 | |
| JP | 2012192065 A | * | 10/2012 | ............. D06F 33/02 |
| JP | 2014083167 | | 5/2014 | |
| JP | 2015-100504 | | 6/2015 | |
| KR | 20050012526 | | 2/2005 | |
| KR | 10-2008-0079071 | | 8/2008 | |
| KR | 20080079071 | | 8/2008 | |
| KR | 10-2010-0009868 | | 1/2010 | |
| KR | 10-2011-0016224 | | 2/2011 | |
| KR | 10-2011-0022291 | | 3/2011 | |
| KR | 20130091101 | | 8/2013 | |
| WO | WO 2013/008362 | | 1/2013 | |
| WO | WO-2018007144 A1 | * | 1/2018 | ............. D06F 33/02 |

OTHER PUBLICATIONS

Extended European Search Report in European Appln. No. 19756968.4, dated Mar. 3, 2022, 10 pages.
Office Action in Korean Appln. 10-2018-0123453, dated Feb. 25, 2023, 24 pages (with English translation).
Office Action in U.S. Appl. No. 16/654,479, dated Jun. 6, 2022, 15 pages.
Office Action in U.S. Appl. No. 16/654,479, dated Oct. 15, 2021, 15 pages.
Office Action in Australian Appln. No. 2019224719, dated Oct. 18, 2021, 5 pages.
Extended European Search Report in European Appln. No. 22201304.7, mailed on Jan. 20, 2023, 10 pages.
Extended European Search Report in European Appln. No. 22201317.9, mailed on Jan. 30, 2023, 10 pages.
AU Office Action in Australian Appln. No. 2019224719, dated Apr. 29, 2021, 4 pages.

\* cited by examiner

| washing performance | 95%↓ | | 97%↓ | | 100% | | 95% | |
|---|---|---|---|---|---|---|---|---|
| amount of water | X | | 0~1ℓ | | 2~4ℓ | | 5ℓ~ | |
| washing temperature | X | | X | | 40℃ | | 34℃ | |
| Circulation | X | X | X | X | X | X | O | O |
| Motor | ∕‾\ | ∕\ | ∕‾\ | ∕\ | ∕‾\ | ∕\ | ∕‾\ | ∕\ |

| washing performance | 98% | | 103% | | 100% | | 95% | |
|---|---|---|---|---|---|---|---|---|
| amount of water | X | | 0~1ℓ | | 2~4ℓ | | 5ℓ~ | |
| washing temperature | 58℃ | | 52℃ | | 40℃ | | 34℃ | |
| Circulation | X | X | X | O | O | O | O | O |
| Motor | ∕‾\ | ∕\ | ∕‾\ | ∕\ | ∕‾\ | ∕\ | ∕‾\ | ∕\ |

WASHING APPARATUS AND METHOD FOR CONTROLLING SAME

CROSS-REFERENCE TO RELATED APPLICATIONS

This application is a National Stage application under 35 U.S.C. § 371 of International Application No. PCT/KR2019/002040, filed on Feb. 20, 2019, which claims the benefit of Korean Application No. 10-2018-0123453, filed on Oct. 16, 2018, Korean Application No. 10-2018-0050965, filed on May 3, 2018, and Korean Application No. 10-2018-0021233, filed on Feb. 22, 2018. The disclosures of the prior applications are incorporated by reference in their entirety.

TECHNICAL FIELD

The present invention relates to a washing apparatus. More particularly, the present invention relates to a washing apparatus equipped with an induction heater to heat a drum and to a method of controlling the washing apparatus.

BACKGROUND ART

A typical washing apparatus is composed of a tub (also referred to as outer tub) for containing washing water and a drum (also referred to as inner tub) rotatably installed in the tub. After laundry (i.e., clothes) is charged into the drum, the drum is rotated and the laundry is washed with detergent and washing water during the rotation of the drum.

In order to enhance washing effect by promoting activation of detergent and decomposition of contaminants, hot washing water is supplied into the tub, or washing water introduced into the tub is heated. To this end, the bottom of the tub is recessed downward to form a heater mounting portion, and a heater is installed in the heater mounting portion. Such a heater used for this purpose is generally a sheath heater.

When a washing course is set such that washing is performed with cold water, the heater will not be operated. However, in a normal washing course, the temperature of washing water is set to 40° C. or higher. Therefore, in many cases, the heater is operated during washing.

The volume of water required for washing is determined depending on a water level required to protect a heater and a water level required to sufficiently soak laundry.

First, about 6 liters of washing water must be supplied to meet the water level (hereinafter, referred to as "heater protection level" for convenience of description) at which the heater can be completely immersed in washing water so as to be protected. In the absence of laundry in the tub, when approximately 6 liters of washing water is supplied to the tub, the heater is completely immersed in the washing water and a lower portion of the drum is also immersed in the washing water.

Second, washing water needs to be sufficiently supplied for laundry soaking as well as for heat protection. When washing water is sufficiently supplied, the amount of water absorbed in the laundry is usually 200% with respect to the amount of the laundry. The volume of washing water required for soaking laundry increases with the weight of laundry. That is, when the weight of laundry to be washed is about 3 kg, about 6 liters of washing water is required to good soaking the laundry.

Laundry soaking starts as soon as water supply starts. Main soaking progresses after the water supply ends. However, water supply for meeting a heater protection water level may be performed even during the laundry soaking. Hereinafter, in order to differentiate water supply performed during the laundry soaking from water supply performed before the laundry soaking, the water supply performed during the laundry soaking will be referred to as additional water supply. It is estimated that about 6 liters of washing water additionally needs to be supplied to the washing apparatus to meet the heater protection water level after the laundry is fully soaked.

That is, a total of about 12 liters of washing water is required to wash 3 kg of laundry. Of course, such an amount (i.e., 12 liters) of washing water is the volume of washing water required for only one washing cycle. That is, the volume of washing water required for rinsing is not included in that amount.

In order to improve the washing effect, washing apparatuses are equipped with a washing water circulation system. The circulation system pumps up washing water from the tub with a circulation pump and then injects it into the drum. Accordingly, the circulation system may include a circulation pump, a water channel serving as a flow path, and a spray nozzle. With this circulation system, water washing water mixed with detergent is sprayed onto the laundry contained in the drum to enhance the washing effect.

However, the washing apparatuses equipped with such a circulation system have a problem in that they require more washing water due to the circulation of the washing water. This is because a certain amount of washing water is required to fill the circulation channel (i.e., water channel) extending from the outside of the tub to the inside of the drum. Therefore, in the case of the circulation-type washing apparatuses, washing water for a washing cycle increases by an amount corresponding to the volume of the water channel to meet the heater protection level.

For circulation of washing water, 1.5 liters of washing water is additionally required. That is, a total of 12 to 13.5 liters of washing water is required to wash 3 kg of laundry. When an ultrasonic level sensor is used to detect the level of water, the water level frequency at the heater protection level is approximately 24.7 KHz or less. A higher detection frequency represents a lower water level.

FIG. 1 shows a relationship between a washing step and a net acting ratio of a drum in a washing apparatus equipped with a heater and a circulation pump. In this washing apparatus, the driving of the drum and the driving of the circulation pump may be synchronized. Therefore, the net acting ratio of the motor may be the same as the net acting ratio of the circulation pump.

At the initial stage of washing, water supply and laundry soaking are performed. In this stage, the drum may perform a tumbling operation. The tumbling operation involves a forward rotation and a reverse rotation. The rotation speed of the drum during the tumbling operation is 40 RPM. When washing water of approximately 1.5 liters or more is supplied to the drum after the initial water supply, the tumbling operation starts for laundry soaking while the water supply continues.

The tumbling operation of the drum makes the laundry in the drum repeatedly rise and fall and it also agitates the laundry. This improves soaking efficiency. In addition to the tumbling operation of the drum, circulation of washing water may be performed to further enhance the soaking efficiency. The water supply and the laundry soaking are continuously performed until the level of the washing water reaches the heater protection level and then does not fluctuate from there. That is, the laundry soaking continues until the laundry becomes completely wet to the extent that the laundry cannot absorb more water. The laundry soaking ends when the laundry is fully soaked.

When the water supply and the soaking are completed, the heater for heating washing water is driven. The washing apparatus is designed such that the net acting ratio of the motor is minimized during the heating of the washing water. For example, the motor is designed to have a net acting ratio of 13% during the heating of the washing water. That is, a time period during which the motor actually operates is about 13% with respect to the overall time period of the heating step. To uniformly heat the laundry and the washing water, the tumbling needs to be minimized.

As the drum rotates, part of the washing water swirls with the drum. Therefore, during this step, the washing water may scatter in all directions and the level of washing water may fluctuate, thereby making the heater be exposed to the air. The heater protection level is not maintained because the heater is exposed to the air. For this reason, the net acting ratio is preferably minimized to maintain the heater protection level while performing minimum tumbling. That is, the net acting ratio in the heating step is set to be considerably lower than the net acting ratio in the soaking step or the net acting ratio in the main washing step.

Since the time period during which tumbling is performed in the heating step is minimized, the washing effect in the heating step is not good. That is, there is a problem in that the overall washing time increases by a time required for the heating and this heating time cannot be used for improvement of washing performance.

In the heating step, the circulation pump does not operate. That is, the driving of the drum is not synchronized with the driving of the circulation pump, and the net acting ratio of the circulation pump is 0% in the heating step. This is because in the case where the circulation pump is driven, washing water of approximately 1.5 liters or more must be additionally supplied. In addition, it is because there is a possibility that the driving of the circulation pump and the tumbling destroys the heater protection water level.

In addition, it is not preferable to additionally supply water to drive the circulation pump or to increase the net acting ratio. This is because, with a given amount of detergent, the concentration of detergent decreases when the volume of washing water supplied increases. That is, in a relatively short period of the heating step, in the case of circulating washing water and increasing the net acting ratio to improve the washing performance, the concentration of detergent decreases. Therefore, the washing performance significantly decreases in the main washing step.

When the washing water is heated up to a predetermined target temperature, main washing is performed with the drum operating at a net acting ratio of about 70%. In this main washing step, the circulation pump also operates.

In summary, existing popular washing apparatuses inevitably consume a large volume of washing water to secure the water level for heater protection. Therefore, there is a problem in that it is difficult to use high-concentration washing water (which refers to washing water in which detergent is dissolved in a high concentration) for laundry washing or a large amount of detergent is required. In addition, the flexibility in selecting the net acting ratio of the drum and/or circulation pump in the heating step is limited to secure a heater protection water level. Therefore, the washing time inevitably increases.

For this reason, there is a strong demand for a washing apparatus and a control method thereof, both being capable of reducing the consumption of washing water, enabling washing with high-concentration detergent water, reducing heating time, saving energy by increasing the flexibility in selecting the net acting ratios of a motor and a circulation pump, and reducing washing time.

DETAILED DESCRIPTION OF THE EMBODIMENTS

Technical Problem

The present invention primarily aims to solve the problems of conventional washing machines.

According to embodiments of the present invention, there are provided a washing apparatus and a control method thereof, both being capable of increasing laundry soaking efficiency by driving a circulation pump during a laundry soaking session even with a small amount of washing water supplied.

According to embodiments of the present invention, there are provided a washing apparatus and a control method thereof, both being capable of shortening soaking time by effectively soaking laundry.

According to embodiments of the present invention, there are provided a washing apparatus and a control method thereof, both being capable of improving washing performance and reducing energy consumption by increasing the net acting ratios of a drum and a circulation pump in a washing water heating step while destroying a heater protection water level.

According to embodiments of the present invention, there are provided a washing apparatus and a control method thereof, both being capable of improving washing performance by driving a circulation pump in a washing water heating step.

According to embodiments of the present invention, there are provided a washing apparatus and a control method thereof, both being capable of enhancing washing performance and reducing energy consumption by reducing energy required to heat washing water.

According to embodiments of the present invention, there are provided a washing apparatus and a control method thereof, both enabling washing with a small amount of washing water which results in high-concentration detergent water.

According to embodiments of the present invention, there are provided a washing apparatus and a control method thereof, both being capable of safely heating washing water even in a case where a heater protection water level is broken.

According to embodiments of the present invention, there are provided a washing apparatus and a control method thereof, both being capable of directly heating a drum with an induction module and indirectly heating washing water with heat radiated from the drum.

According to embodiments of the present invention, there are provided a washing apparatus and a control method thereof, both being capable of preventing a drum from overheating when heating the drum with an induction module, thereby safely performing laundry washing. According to embodiments of the present invention, there are provided a washing apparatus and a control method thereof, both being capable of increasing a time period (i.e., net acting ratio of an induction module) in which an induction module actually operates, thereby improving heating efficiency and washing efficiency.

According to embodiments of the present invention, there are provided a washing apparatus and a control method thereof, both interlocking driving of a drum with driving of an induction module and especially interlocking driving of the drum with driving of a circulation pump, thereby preventing the drum from being overheated by the induction module.

According to embodiments of the present invention, there are provided a washing apparatus and a control method thereof, both being capable of ensuring safe washing by sensing the temperature of a drum with a drying temperature sensor and forcibly stopping operation of the induction module when the drum is overheated. According to embodiments of the present invention, there are provided a washing apparatus and a control method thereof, both being capable of rapidly cooling the drum by maintaining operation of the drum and/or the circulation pump even when the operation of the induction module is forcibly stopped.

According to embodiments of the present invention, there are provided a washing apparatus and a control method thereof, both being capable of ensuring safe washing by preventing a drum or laundry from being overheated by an induction module by detecting the overheating of the drum with a drying temperature sensor and a water temperature sensor that are installed at different locations, sense the temperatures of different targets, and senses the temperatures at different times.

Technical Solution

In order to achieve the above objects, one aspect of the present invention provides a washing apparatus including a tub, a drum, an induction module mounted on a surface of the tub and configured to heat the drum by electromagnetic induction, and a circulation pump configured to pump washing water from the tube into the drum. In addition, another aspect of the present invention provides a method of controlling the same apparatus.

According to one embodiment of the present invention, there is provided a method of controlling a washing apparatus, the method including: a water supply step of supplying washing water to a tub via a water valve; a soaking step of soaking laundry by driving the drum while circulating the washing water with a circulation pump, after the water supply step ends; a heating step of heating by driving an induction module after the soaking step ends; and a main washing step of performing main washing by driving the drum after the heating step ends, in which a water level detected at the end of the soaking step is higher than a water level detected at the end of the water supply step.

The washing apparatus may undergo a washing course composed of a washing cycle, a rinsing cycle, and a drying cycle that are sequentially performed. In the washing cycle, the water supply step, the soaking step, the heating step, and the main washing step may be sequentially performed.

In the water supply step, the washing water may be supplied until the washing water reaches or exceeds a predetermined water level at which a lower portion of the drum is immersed in the washing water. In the water supply step, since the water supply is performed for laundry soaking, a sufficient volume of washing water must be supplied to fully soak laundry.

In the water supply step, the water valve may be controlled such that the washing water is supplied multiple times so that the water level rises stepwise. At an initial stage of the water supply step, the washing water may be intermittently supplied. At a later stage of the water supply step, the washing water may be continuously supplied.

The soaking step may include a step of measuring the water level. When the measured water level is lower than a circulation water level, washing water may be additionally supplied.

The water level may be lowered in the soaking step. This is because the washing water is absorbed by the laundry in the soaking step.

In the soaking step, it is important to determine a first water level at which additional water supply needs to be started or a second water level at which additional water supply needs to be stopped and at which soaking ends. This is because the volume of washing water required for the washing cycle is determined in the soaking step due to the fact that water supply substantially ends in the soaking step. In addition, it is because a water level in the soaking step may be the same as a water level in the subsequent heating step.

For this reason, in the present embodiment, a reference water level in the soaking step may be a circulation water level.

The circulation water level may refer to a water level corresponding to the volume of washing water required to fill a circulation channel when the circulation pump is driven or a water level formed by a small amount of washing water. Specifically, the circulation water level may be a water level at which a lower end of the drum is not immersed in the washing water. More specifically, the amount of the washing water corresponding to the circulation water level is preferably 1 liter or more and 1.5 liters or less.

Therefore, it is preferable that the additional water supply is performed until the circulation water level is reached. It is preferable that the additional water supply is carried out in a state of an empty level which means no remaining water exists in the tub. The additional water supply is performed when the empty level is detected in the soaking step, and the additional water supply is continuously performed until the circulation water level is reached.

In the water level sensing step and the additional water supply step, it is preferable that the drum and the circulation pump are controlled not to operate. This is to accurately sense the water level in a state in which the water level does not fluctuate.

In the present embodiment, in the soaking step, the level of washing water may be maintained below a lower end of the drum until the laundry soaking is completed. Therefore, in order to perform the laundry soaking, it is preferable to drive a circulation pump to pump up the washing water into the drum from the tub.

Preferably, in the soaking step, the drum may perform a tumbling operation and a filtration operation.

The laundry may be evenly distributed in the drum and can be turned over due to the tumbling operation of the drum. This makes the laundry uniformly soaked. The filtration operation squeezes the laundry while washing water is sprayed onto the laundry. That is, the washing water passes through the laundry. Through this filtration operation, it is possible to effectively wet the laundry and to secure the amount of washing water that is needed for circulation.

In the soaking step, the tumbling operation and the filtration operation may be sequentially and repeatedly performed. By carrying out the filtration operation, it is possible to wet the laundry even with a small volume of washing water by driving the circulation pump. This tumbling operation further improves the soaking efficiency.

In the soaking step, the operation of the drum may be a cyclical operation in which the tumbling operation and the filtration operation are a series of events that happen repeatedly in the same manner each time. That is, in one operation cycle, the drum may operate two rotation speeds (measured in units of RPM). The drum starts rotating, accelerates to reach a tumbling operation speed (in units of RPM), rotates at the tumbling operation speed for a predetermined period of time, accelerates more to reach a filtration operation speed (in units of RPM), and rotates at the filtration operation speed for a predetermined period of time. When the motor is turned off while the drum operates at the filtration operation speed, the drum gradually decelerates to stop. The tumbling operation and the filtration operation may be sequentially performed seamlessly.

In the soaking step, the cyclic operation of the drum repeats multiple times, and the cyclic operation is preferably interlocked with the operation of the circulation pump.

It is preferable that an event in which the motor is turned on for the cyclic operation coincides with an event in which the circulation pump is turned on, and it is preferable that an event in which the motor is turned off coincides with an event in which the circulation pump is turned off. A time period in which the motor is on may coincides with a time period in which the circulation pump is on.

In an early period of the cyclic operation, the amount of washing water is sufficient so that the circulation pump can be driven. Therefore, in an early half period of the cyclic operation, the tumbling operation is performed, and in a later half period of the cyclic operation, the filtration operation is performed.

In the cyclic operation, a time period for the tumbling operation is preferably longer than a time period for the filtration operation. This also enhances the soaking efficiency.

In the heating step and the main washing step, it is preferable that the additional water supply via the water valve is prevented. A target water level in the water supply step may be higher than a target water level in the soaking step. It is preferable that the water supply is performed in both the water supply step and the soaking step. In this case, it is possible to reduce a water supply time in the washing cycle, resulting in a reduction in the overall washing time.

It is preferable that the soaking step ends when a change does not occur in the washing level through the operations of the drum and the circulation pump. That is, it is preferable that the soaking step ends when the water level does not change through laundry soaking because the laundry is fully soaked.

The soaking step ends when the water level becomes a circulation water level that corresponds to the volume of washing water required to fill a circulation channel to drive the circulation pump or a circulation water level formed by a small amount of washing water.

The heating step and the main washing step may be performed when the water level is the circulation water level.

In the heating step, the water level may be a level at which a lower end of the drum is not immersed in the washing water.

In the heating step, the water level may be a circulation water level or below. That is, the water level may correspond to a lesser amount than the amount of washing water staying in a circulation channel to drive the circulation pump.

In the present embodiment, it may not be necessary to maintain a heat protection level at which a heater can be protected. Therefore, the circulation pump can be normally operated with a minimum amount of washing water.

More preferably, in the heating step, the amount of washing water stored in the tub to form the circulation water level may be 1 liter or less. The minimum amount of washing water means that a total amount of washing water is small and thus it is possible to provide high-concentration detergent water.

In the heating step, it is preferable that the drum, the circulation pump, and the induction module are driven.

The outer circumferential surface of the drum is heated by the induction module. In this case, the drum rotates and the drum is thus evenly heated. The drum rotates and washing water is injected into the drum. Therefore, not only the washing water but also the laundry may be heated evenly.

Here, the induction module may actually heat the drum, the washing water, and the laundry. On the premise that the volume of the drum, the volume of the laundry, and the maximum amount of the washing water absorbed by the laundry are the same, the smaller the amount of residual washing water, the higher the heating efficiency. According to the present embodiment, a much smaller amount of residual washing water than an amount of residual washing water required to meet the heater protection water level is needed. Therefore, heating efficiency can be improved.

A time period in which the drum operates includes a time period in which the circulation pump operates and a time period in which the induction module operates. That is, the circulation pump and the induction module may operate only when the drum operates. The laundry in the drum moves when the drum operates. Thus, it is effective to spray washing water at this time. In addition, in a case where the induction module is driven when the drum is driven, the drum can be evenly heated and may not be overheated. This setting is determined to heat the entire washing water including the residual washing water.

Therefore, it is preferable that the induction module is not operated in an operation period in which the drum is not operated.

In the heating step, the net acting ratio of the drum may be 50% or more. More preferably, the net acting ratio may be more preferably 80% or more. The heating mechanism used in the present embodiment is different from a conventional heating method in which washing water is first heated and then the heated washing water is supplied to laundry. That is, the heating mechanism used in the present embodiment directly heats the drum, and the heated drum heats the laundry and the washing water simultaneously. Since the drum is directly heated instead of a heater submerged in washing water, the present embodiment does not require that the heater protection water level be maintained. Therefore, a net acting ratio in the heating step can be dramatically increased.

This means that it is possible to further increase the washing effect by applying mechanical force to the laundry. In addition, the laundry and the washing water can be heated evenly. Due to the characteristics of the heating mechanism in the heating step, the water level, the operation of the circulation pump, and the operation of the drum, the heating step in the present embodiment can effectively improve heating efficiency and washing efficiency.

In the heating step, the drum may perform a tumbling operation and a filtration operation.

In the heating step, the operation of the drum may be a cyclic operation in which the tumbling operation and the filtration operation are a series of events that happen repeatedly.

In the soaking step, it is preferable that the drum performs the tumbling operation in the first half of the operation period of the circulation pump and the filtration operation in the second half of the operation period of the circulation pump.

In order to accomplish one of the objectives of the present invention, according to one embodiment of the present invention, there is provided a washing apparatus including: a tub configured to contain washing water; a drum rotatably mounted in the tub and configured to contain laundry; a motor for driving the drum; an induction module mounted on a surface of the tub and configured to heat the drum through electromagnetic induction; a circulation pump configured to pump washing water into the drum from the tub; a water valve that allows washing water to be supplied to the tub when opened; a level sensor that senses a level of washing water in the tub; and a controller that controls operations of the motor, the induction module, the circulation pump, and the water valve, in which the controller controls the water valve such that washing water is supplied via the water value to reach a target level that is lower than a lower end of the drum while the water level is sensed by the level sensor and controls the drum and the circulation pump to operate after the water level sensed by the level sensor reaches the target water level.

After reaching the target water level, a heating step and a main washing step may be performed. In the heating step, the drum, the circulation pump, and the induction module may be driven to operate. After reaching the target water level, it is preferable that additional water supply is not performed.

When the water supply is finished in a washing cycle, the heating step may be performed. The controller may perform control such that the heating step is performed after the end of the water supply. In the heating step, the controller may control the circulation pump and the induction module to be driven within an operation period in which the drum operates.

In the present embodiment, the controller may perform water supply control by controlling a water valve and a level sensor, operation control for the induction module, operation control for the drum, and operation control for the circulation pump, thereby enabling an effective washing method and a washing apparatus exhibiting good washing performance.

In order to achieve one of the objectives described above, according to one embodiment of the present invention, there is provided a method of controlling a washing apparatus including a tub, a drum, an induction module mounted on a surface of the tub and configured to heat the drum through electromagnetic induction, and a circulation pump that pumps washing water into the drum from the tub, the method including: a water supply step of supplying washing water to the tub via a water valve; a soaking step of soaking laundry by driving the drum while circulating washing water with the circulation pump after the water supply step ends; a heating step of heating the drum by driving the induction module after the soaking step ends; and a main washing step of washing the laundry by driving the drum after the heating step ends, wherein in the heating step, a water level is below a lower end of the drum, and the drum, the circulation pump, and the induction module are driven to operate, thereby heating the drum, the washing water, and the laundry.

In order to accomplish one of the objectives described above, according to one embodiment of the present invention, there is provided a method of controlling a washing apparatus including a tub, a drum, and an induction module mounted on the tub and configured to heat the drum through electromagnetic induction, the method including: a water supply step of supplying washing water into the tub via a water valve; and a heating step of heating by driving the induction module after the water supply step ends, wherein in the heating step, an operation of the drum is interlocked with an operation of the induction module, a time period in which the drum operates includes a time period in which the induction module operates, and the induction module is not operated at a time that outside the time period in which the drum operates.

The water supply step may include an initial water supply step and an additional water supply step. In the additional water supply step, the washing water is supplied multiple times at respective different time points. In the water supply step, soaking may be performed. After the water supply step and the soaking step end, the heating step may start. After the washing water is heated through the heating step, main washing may be performed.

In the water supply step, cold water may be supplied and laundry soaking may be performed with the cold water. The washing may be performed after the soaking is completed and the cold water is heated. The laundry may be heated after being fully soaked, thereby being free from thermal damage.

In order to accomplish one of the objectives described above, according to one embodiment of the present invention, there is provided a method of controlling a washing apparatus constructed such that a drum in which laundry is contained is heated by an induction heater mounted on a tub, the method including: a water supply step of supplying washing water mixed with detergent into the drum; a soaking step of soaking laundry contained in the drum with washing water after the water supply step ends; and a heating step in which after the soaking step ends, washing water in a lower portion of a tub is repeatedly pumped into the drum by a circulation pump, and the washing water and the laundry are indirectly heated by heating the drum with the induction heater while the drum rotates.

In order to accomplish one of the objectives described above, according to one embodiment of the present invention, there is provided a washing apparatus including: a tub configured to contain washing water; a drum rotatably installed in the tub and configured to contain laundry; a circulation pump that circulates washing water contained in the tub; an induction heater that heats the drum by generating a magnetic field; and a controller that controls the induction heater to heat the washing water and the laundry, controls the drum such that the drum rotates alternatively at a filtration operation speed and a tumbling operation speed, and controls the circulation pump such that the washing water in the tub is circulated.

The washing water may be injected into the drum and supplied to the laundry while the drum performs the tumbling operation by which the laundry repeatedly rises and falls and the filtration operation by which the laundry rotates in close contact with an inner circumferential surface of the drum. During the tumbling operation, a large portion of washing water (i.e., circulation water) supplied to the laundry may be absorbed by the laundry. During the filtration operation, a large portion of the washing water (i.e., circulation water) supplied to the laundry may be squeezed out of the laundry. The washing water prepared by dissolving detergent in water is absorbed into and squeezed out of the laundry, repeatedly, so that washing performance can be improved. In addition, when circulation water is supplied into the drum, the circulation water may be absorbed by the laundry or may be introduced into the tub by flowing along an inner circumferential surface of the drum. Thus, the washing water may be repeatedly heated.

When driving the circulation pump in a state in which a water level is low, the amount of washing water may be insufficient. A shortage of washing water may cause malfunction or noise of the circulation pump. Since the filtration operation is periodically and repeatedly performed, recovery of circulation water can be promoted. Therefore, even when a small amount of washing water is supplied, the circulation pump can be smoothly driven.

The tumbling operation may be replaced with a swing operation. The swing operation refers to an operation in which the drum repeatedly turns left and right at a speed that is lower than the speed of the tumbling operation.

The tumbling operation (or swing operation) and the filtration operation may form one cycle, and the cycle may repeat. One filtration operation and one tumbling operation that are performed seamlessly constitute one operation cycle, and the operation cycle may repeat multiple times. After the drum performs multiple operation cycles, the drum may pause for a predetermined resting time, and then perform multiple operation cycles again.

Alternatively, the drum may operate in a manner that an operation period (operation cycle) and a resting period alternately occur. A set of the operation period and the resting period may repeat.

The present invention may be implemented in a manner that features of one of the above-described embodiments are combined with features of another embodiment unless the features are contradictory to each other.

Advantageous Effects

According to embodiments of the present invention, it is possible to provide a washing apparatus and a control method thereof, both being capable of improving soaking efficiency even with a small volume of washing water supplied by driving a circulation pump in a soaking step.

According to embodiments of the present invention, it is possible to provide a washing apparatus and a control method thereof, both being capable of reducing soaking time while improving soaking efficiency.

According to embodiments of the present invention, it is possible to provide a washing apparatus and a control method thereof, both being capable of improving washing performance and reducing energy consumption by increasing the net acting ratios of a drum and a circulation pump in a washing water heating step in which a heater protection water level is broken.

According to embodiments of the present invention, it is possible to provide a washing apparatus and a control method thereof, both being capable of improving washing performance by driving a circulation pump in a water heating step.

According to embodiments of the present invention, it is possible to provide a washing apparatus and a control method thereof, both being capable of securing good washing performance and reducing energy consumption by reducing energy and time required to heat washing water.

According to embodiments of the present invention, it is possible to provide a washing apparatus and a control method thereof, both being capable of using high-concentration detergent water by minimizing the volume of washing water used.

According to embodiments of the present invention, it is possible to provide a washing apparatus and a control method thereof, both being capable of safely heating washing water even in a state where a heater protection water level is broken.

According to embodiments of the present invention, it is possible to provide a washing apparatus and a control method thereof, both being capable of directly heating a drum with an induction module and indirectly heating washing water with the heat radiated from the drum.

According to embodiments of the present invention, it is possible to provide a washing apparatus and a method of controlling the apparatus in which a heating cycle of an induction module is set to be the same as a heating cycle of a circulation pump, thereby preventing laundry from being overheated and damaged.

According to embodiments of the present invention, it is possible to provide a washing apparatus and a method of controlling the apparatus in which a heating cycle of an induction module is set to be substantially the same as or to be included within a rotation cycle of a drum, thereby effectively preventing the drum from being overheated and ensuring safe washing. In addition, it is possible to provide a washing apparatus and a method of controlling the apparatus, both being capable of preventing a drum from being overheated by sensing the temperature of the drum with a drying temperature sensor.

According to embodiments of the present invention, it is possible to provide a washing apparatus and a method of controlling the apparatus, both being capable of preventing a drum from being overheated by an induction module. According to embodiments of the present invention, it is possible to provide a washing apparatus and a control method thereof, both increasing an operating time (i.e., net acting ratio) of an induction module in a heating cycle, thereby improving heating and washing efficiencies.

According to embodiments of the present invention, it is possible to provide a washing apparatus and a method of controlling the apparatus in which operation of a drum is interlocked with operation of an induction module and operation of a circulation pump, thereby preventing the drum from being overheated by the induction module.

According to embodiments of the present invention, it is possible to provide a washing apparatus and a control method thereof, both being capable of ensuring safe washing by detecting overheating of a drum with a drying temperature sensor and forcibly stopping the operation of an induction module when it is determined that the drum is overheated. Specifically, in the case of forcibly stopping the operation of the induction module, the drum and/or the circulation pump are still operated as scheduled, thereby rapidly cooling the drum.

According to embodiments of the present invention, it is possible to provide a washing apparatus and a control method thereof, both ensuring safe washing by preventing an induction module from overheating a drum with the use of a drying temperature sensor and a water temperature sensor that are installed at different locations, that sense the temperatures of different mediums, and that sense the temperatures at different times.

BEST MODE

Hereinafter, a washing apparatus and a control method thereof according to embodiments of the present invention will be described in detail with reference to the accompanying drawings.

The applicant has filed an application for a patent for a washing apparatus equipped with an induction module, and the application is filed under Korean Patent Application No. 10-2017-0101332 (hereinafter, referred to as preceding patent application).

Matters not described in this specification may be the same or similar to those disclosed in the preceding patent application unless being contradictory to the preceding patent application.

Figure 2:
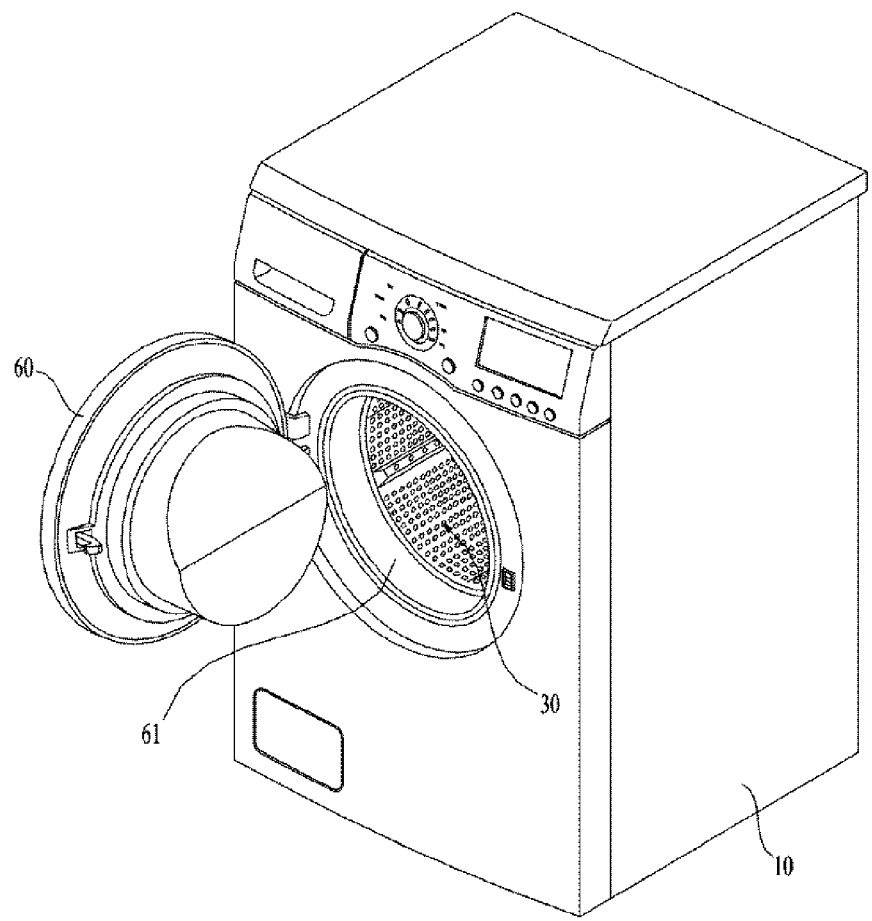
FIG. 2 is a perspective view illustrating the appearance of a washing apparatus according to one embodiment of the present invention.
Figure 3:
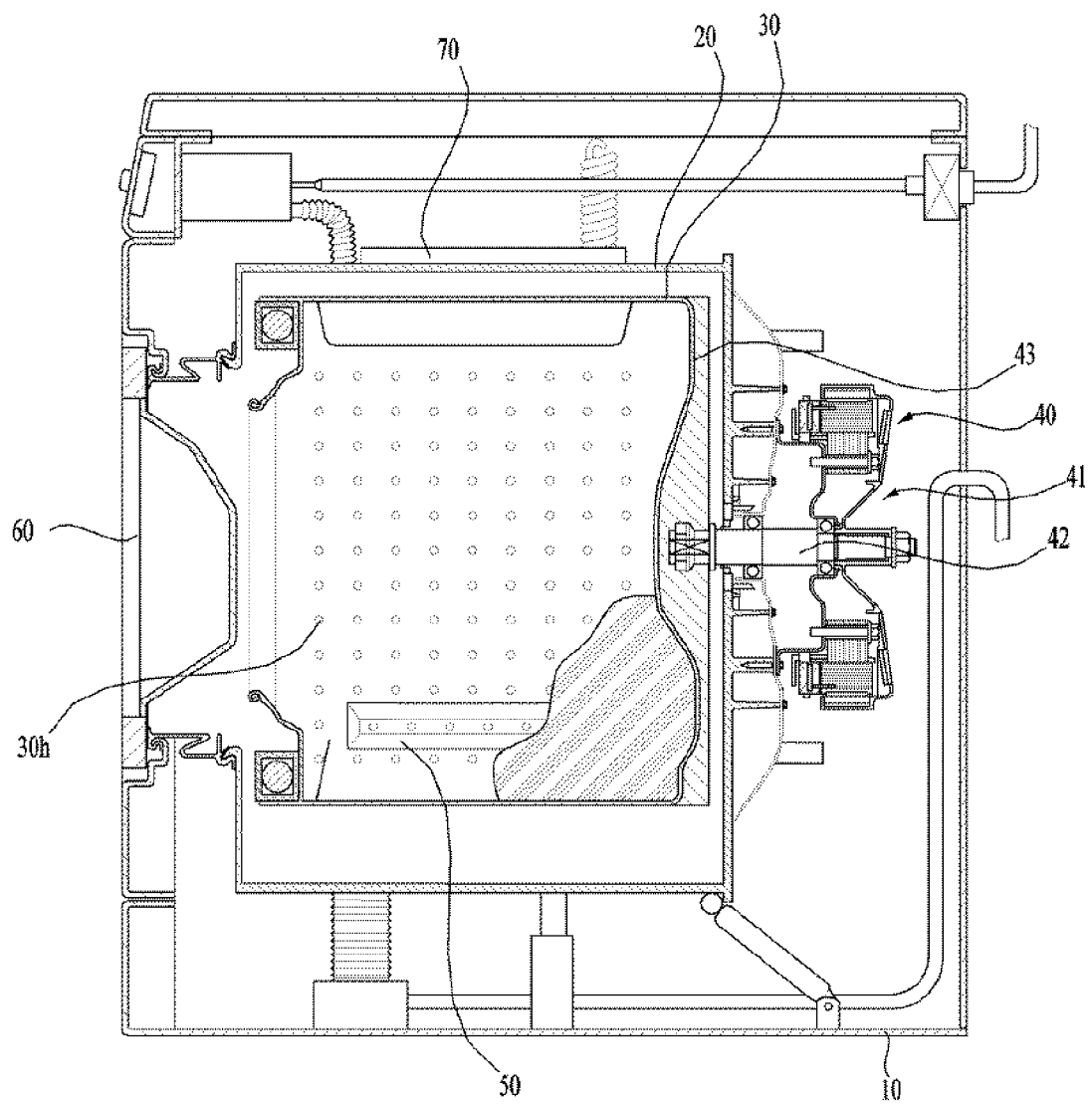
FIG. 3 is a cross-sectional view of the washing apparatus according to one embodiment of the present invention.

Hereinafter, a washing apparatus equipped with an induction heater according to an embodiment of the present invention will be described with reference to FIGS. 1 to 3.

Figure 1:
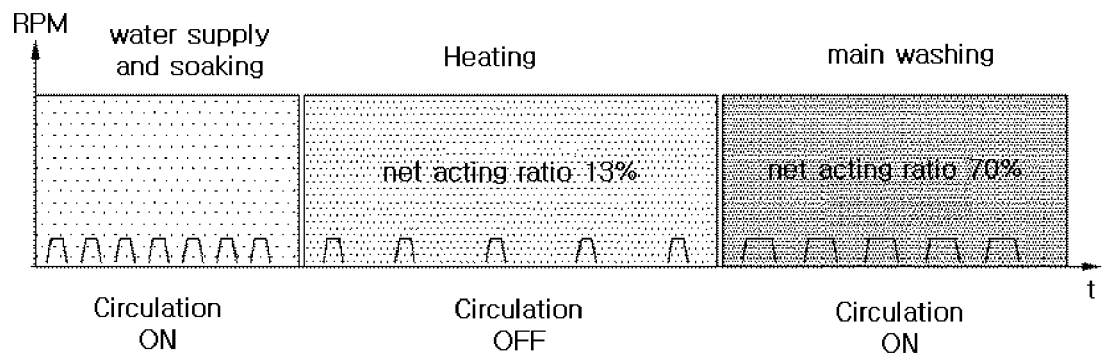
FIG. 1 is a diagram illustrating a washing cycle involving multiple tasks performed by a drum and a circulation pump in an existing washing apparatus.

FIG. 1 is a perspective view illustrating the appearance of a washing apparatus according to one embodiment of the present invention. FIG. 2 is a cross-sectional view illustrating the internal structure of the washing apparatus according to the embodiment of the present invention. FIG. 3 is a conceptual view illustrating an assembly in which an induction heater module is mounted in a tub.

A washing apparatus according to one embodiment of the present invention includes a cabinet 10 defining the exterior of the apparatus, a tub 20, a drum 30, and an induction heater 70 that heats the drum 30.

The tub 20 is installed in the cabinet 10 and constructed to accommodate the drum 30. The drum 30 is rotatably installed in the tub 20 and contains laundry. The drum 30 has an opening that is positioned at the front of the cabinet. Laundry can be charged into the drum 30 through the opening.

The sides of the drum 30 are perforated with holes 30h through which air and washing water move from the tub 20 to drum 30 or from the drum 30 to the tub 20.

The induction heater (IH) or an IH module 70 heats the drum 30 by generating an electromagnetic field. The induction heater 70 may be mounted on the outer flank surface of the tub 20. The washing water may include the tub 20 provided with an accommodation space and having an opening in the front, the drum 30 made of a conductor and rotatably installed in the accommodation space to hold laundry, and the induction heater 70 mounted on the outer flank surface of the tub 20 and configured to heat the drum 30 using an electromagnetic field.

The tub 20 and the drum 30 have a cylinder shape. Therefore, the inner surface and the outer surface of each of the tub 20 and the drum have a cylinder shape. FIG. 3 illustrates a washing apparatus in which the drum 30 rotates around a rotation axis parallel to the ground. However, the orientation of the drum is not limited thereto. For example, the drum 30 and the tub 20 may be tilted backward.

The washing apparatus further includes a driving unit 40 that rotates the drum 30 installed in the tub 20. The driving unit 40 includes a motor 41. The motor 41 includes a stator and a rotor. The rotor is connected to a rotation shaft 42. The rotation shaft 42 is connected to the drum 30, thereby rotating the drum 30 installed in the tub 20.

The driving unit 40 includes a spider 43. The spider 43 is a configuration that connects the drum 30 with the rotating shaft 42. The spider 43 uniformly and stably transmits the torque of the rotation shaft 42 to the drum 30.

The spider 43 is coupled to the drum 30 in a manner to be partially inserted into the rear wall of the drum 30. To this end, the rear wall of the drum 30 is recessed inward. The spider 43 is coupled in a manner to be inserted into the drum 30 in the center of rotation of the drum 30.

Multiple lifters 50 are disposed in the drum 30. The multiple lifters 50 are arranged in a circumferential direction of the drum 30. The lifters 50 function to agitate the laundry. For example, when the drum 30 rotates, the lifters 50 raise the laundry.

The laundry lifted upward by the lifters 50 falls due to gravity. The laundry is washed by impacting force caused by the falling. The stirring and agitation of the laundry improve drying efficiency. The laundry can be evenly distributed in the drum 30 in backward and forward directions. Therefore, the lifters 50 are installed to extend from the rear end to the front end of the drum 30.

The induction heater 70 is a device for heating the drum 30.

Figure 4:
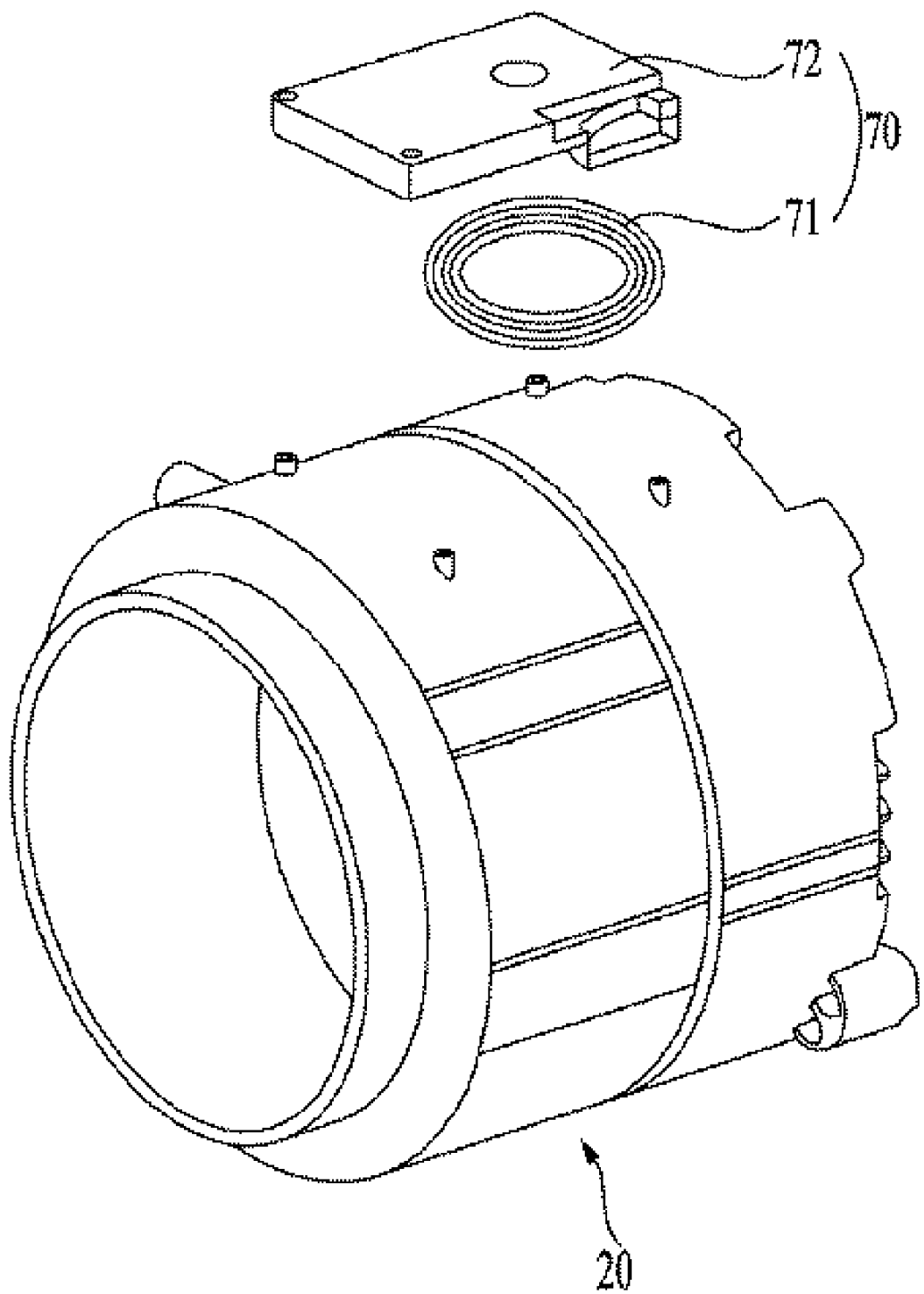
FIG. 4 is an exploded perspective view illustrating a tub and an induction module of the washing apparatus according to one embodiment of the present invention.

As shown in FIG. 4, the induction heater 70 includes a coil 71 that receives a current and generates a magnetic field to generate an eddy current in the drum 30 and a heater cover 72 that encases the coil 71. The structure of the induction heater 70 and the principle based on which the induction heater 70 heats the drum 30 are described in detail in the specification of the preceding patent application mentioned above, and thus a redundant description will be omitted.

In the washing apparatus, the coil 71 heats the drum 30 to increase the temperature of air inside the drum 30 as well as the temperature of the main body of the drum 30. Therefore, the washing water in contact with the drum 30 is heated by performing heat exchange with the drum 30, and the laundry in contact with the inner surface of the drum 30 is also heated. Of course, it is also possible to heat the laundry that is not in contact with the inner surface of the drum 30 by raising the temperature of air in the drum 30.

Therefore, it is possible to increase the ambient temperature inside the drum 30, the temperature of washing water, and the temperature of laundry to enhance the washing efficiency. In addition, it is also possible to heat the laundry, the drum 30, and the ambient temperature inside the drum 30 to enhance drying efficiency.

Although FIG. 4 illustrates a configuration in which the induction heater 70 is mounted on top of the tub 20, other configurations are also possible. For example, the induction heater 70 may be mounted on the top surface, the bottom surface, or either one of the side surfaces. Regarding the mounting position of the induction heater 70, it is noted that the induction heater 70 must be installed at a position higher than the maximum water level in the tub 20.

The induction heater 70 is provided on one of the outer circumferential surfaces of the tub 20, and the coil 71 of the induction heater 70 is composed of one or more turns wound along the surface where the induction heater 70 is adjacent to the tub 20.

As a result, the induction heater 70 may emit an induced magnetic field directly to the outer circumferential surface of the drum 30 to generate an eddy current, and consequently directly heat the outer circumferential surface of the drum 30.

A controller 90 (see FIG. 5) controls the current output from the induction heater 70. The controller 90 may control an ON/OF operation and an output signal of the induction heater 70.

The induction heater 70 is connected to an external power source via a cable to receive electric power from the power source. Alternatively, the induction heater 70 may receive electric power from the controller 90 that controls the overall operation of the washing machine. That is, the induction heater 70 can receive electric power from any source to supply electric power to the internal coil 71 thereof.

When the induction heater 70 is powered and AC current flows through the coil 71, the drum 30 is heated.

In this case, if the drum 30 does not rotate, only one side of the drum 30 will be heated. Therefore, the drum 30 will be locally overheated or never heated. That is, the drum 30 is unevenly heated. In addition, the laundry contained in the drum 30 cannot be sufficiently supplied with heat.

For this reason, when the induction heater 70 is driven, the motor 41 of the driving unit 40 is driven to rotate the driving unit 40. This interlocked control is performed by the controller 90. Conversely, it is also possible that when the drum 30 is first rotated by the motor, the induction heater 70 is driven.

The speed at which the drum 30 is rotated by the motor 41 of the driving unit 40 is not particularly restricted if the drum 30 is rotated in a manner that all the surfaces thereof can be uniformly heated by the induction heater 70.

Because the drum 30 rotates, all the surfaces of the drum 30 are uniformly heated so that the laundry in the drum 30 can be evenly exposed to heat.

With this configuration, although the induction heater 70 is mounted on only anyone surface of the top surface, the bottom surface, and both side surfaces of the tub 20 as in the washing apparatus according to one embodiment of the present invention, instead of a configuration in which all of the surfaces are provided with the respective induction heaters, the surfaces of the drum 30 can be uniformly heated.

According to one embodiment of the present invention, the drum 30 can be heated to a high temperature of, for example, 120° C. in a very short time after the induction heater 70 is driven. If the induction heater 70 is driven in a state in which the drum 30 does not rotate or rotates at an excessively low speed, the drum 30 may be locally overheated in a short time. It is because heat cannot be sufficiently transferred from the heated drum 30 to the laundry.

Therefore, correlations between the rotation speed of the drum 30 and the operation of the induction heater 70 are very important. It is more preferable that the drum 30 is driven first and the induction heater 70 is then driven than a case where the induction heater 70 is driven first and the drum 30 is then driven.

As described above, the washing apparatus according to one embodiment of the present invention can save washing water because it is not necessary to completely submerge laundry in washing water in the soaking step. It is because a portion of the drum 30, which comes into contact with washing water, continuously changes due to the rotation of the drum 30. That is, washing water is heated each time a heated portion of the drum 30 comes into contact with washing water while the drum 30 is rotating.

As described above, the washing apparatus according to one embodiment of the present invention can increase the temperature of laundry and the ambient temperature of the internal space of the drum in which the laundry is contained. This is because, the drum 30 which to come into contact with laundry is heated. Therefore, it is possible to effectively heat laundry even in a state in which the laundry is submerged in washing water.

For example, it is not necessary to sterilize laundry by fully immersing the laundry in washing water, the usage of washing water is reduced. This is because the laundry receives conductive heat from the drum 30 rather than from heated washing water. In addition, since the internal space of the drum 30 turns hot and humid due to steam or vapor generated when wet laundry is heated, sterilizing efficiency is improved.

Therefore, it is possible to replace a conventional boil-washing cycle in which laundry is immersed in boiled water and which consumes a large volume of washing water with the invented washing method which consumes much less water for washing. That is, the invented washing method can save energy because it is necessary to heat washing water having a high specific heat value.

Through the invented method described above, it is possible to reduce an amount of washing water used to increase the temperature of laundry and it is accordingly possible to reduce the overall washing time. This is because it is possible to reduce an amount of washing water and a time required for supply of additional water after the soaking step. Therefore, washing time can be reduced.

The level of detergent water which is a mixture of detergent and washing water may be lower than a minimum water level of the drum 30. In this case, it is possible to more effectively use a small amount of washing water by supplying pumping washing water into the drum 30 from the tub 20 with a circulation pump 80. The pumping of the washing water by the circulation pump 80 is controlled by the controller 90.

Moreover, it is possible to eliminate a configuration of a heater that is disposed under the tub 20 to heat washing water as in a conventional washing machine. Therefore, the structure of the washing apparatus is simplified and the capacity of the tub 20 can be increased with the same size of a machine cabinet.

It is noted that existing heaters mounted in the tub 20 are difficult to increase the heating surface thereof. Such a heater has a small surface area that comes into contact with air or laundry. However, the surface area of the drum 30 is relatively large compared to the surface area of such a heater, Since the invention apparatus has a large surface area serving as a heating area, the heating effect is rapidly exhibited.

The heating mechanism of the typical heater mounted in the tub 20 during the washing is that the heater first heats the washing water, and the heated washing water increases the temperatures of the drum 30, the laundry, and the temperature of the internal space of the drum 30. Therefore, it takes a long time to heat the laundry to a high temperature.

However, as described above, the circumferential surface of the drum 30, which serves as a contact surface to come into contact with laundry, washing water, and air in the drum 30, is relatively large compared to the heater mounted in the tub. Therefore, the heated drum 30 directly heats the washing water, the laundry, and the air in the drum 30. The induction heater 70 as a heat source for heating for washing has improved heating efficiency compared to the tub heater.

When the washing water is heated by the tub, it is normal that the operation of the drum 30 is stopped. This is to drive the tub heater submerged in washing water in a state in which the water level is stable. Therefore, washing time increases by a time required to heat washing water.

On the other hand, when washing water is heated by the induction heater 70, the drum must be rotated during the heating. If the drum is not rotated, the drum is only locally heated, resulting in that the washing water is irregularly heated and the drum is locally heated. For this reason, the laundry may be damaged or the washing machine may malfunction. In the case of heating washing water with the drum rotating, the washing water containing detergent is agitated. Therefore, the detergent can be effectively dissolved in the washing water. Moreover, since the contact time between the surface of the drum and the washing water increases, heating time required to heat the washing water is reduced.

Figure 5:
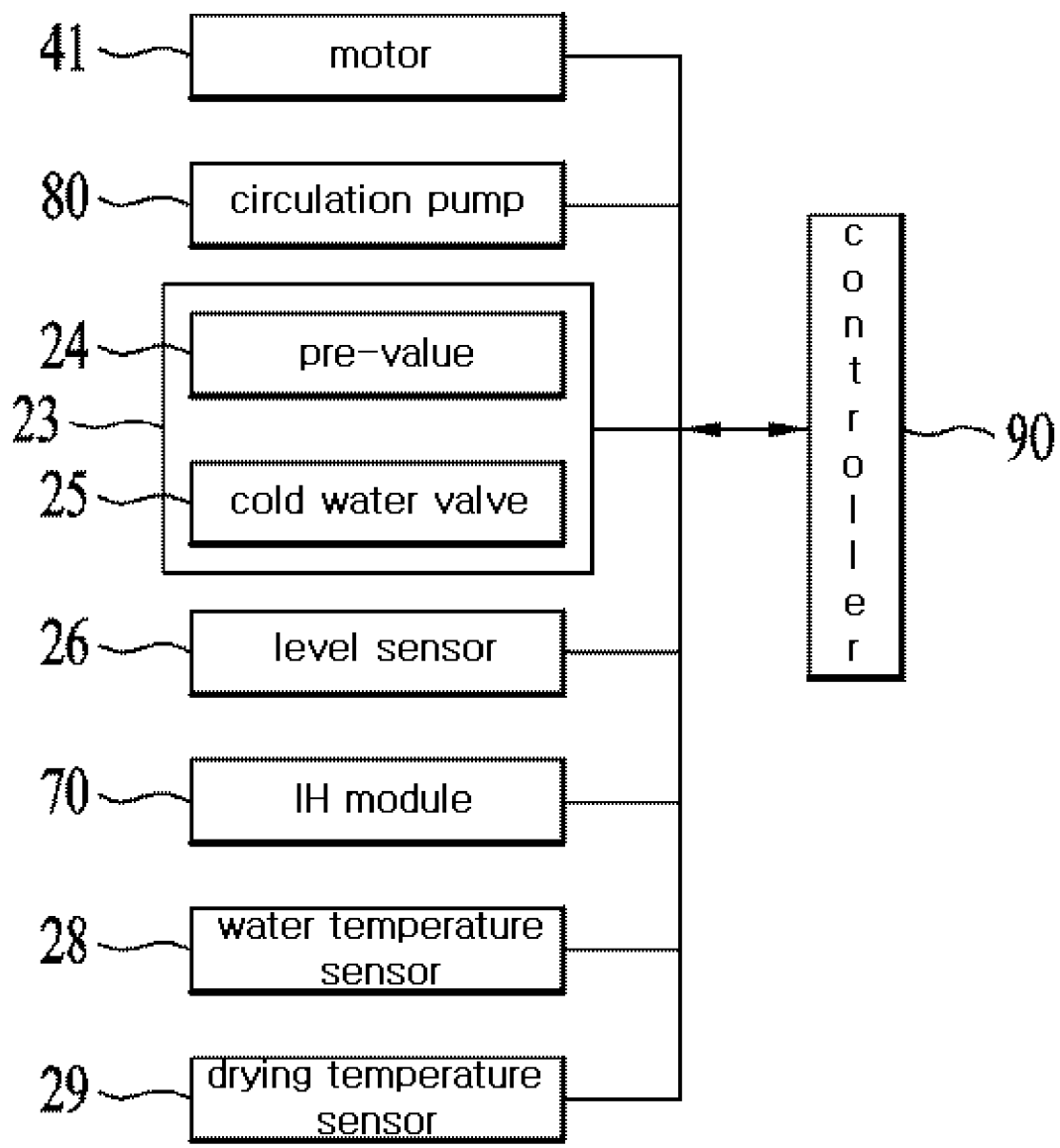
FIG. 5 is a block diagram illustrating specific components to be controlled to perform washing among components of the washing apparatus according to one embodiment of the present invention.

Referring to FIG. 5, a configuration for controlling a washing apparatus, which involve according to one embodiment of the present invention will be described in detail below.

A controller 90 is a main processor that controls the overall operation of the washing apparatus. Various components of the washing apparatus are controlled by the controller.

A motor 41 drives a drum. That is, the motor 41 rotates the drum. The torque of the motor 41 is directly or indirectly transferred to the drum. Recently, direct-transfer motors that directly transfer the torque thereof to a drum have been widely used.

An operation pattern of the drum depends on an operation pattern of the motor 41. The controller 90 controls the motor 41 such that the drum operates in various ways: for example, tumbling, filtration, spinning, etc. The way in which the drum moves is hereinafter referred to as motion of the drum.

A driving time during which the motor actually operates with respect to a predetermined time period is referred to as net acting ratio. When the motor actually operates only for 50 seconds within a period of 100 seconds, the net acting ratio of the motor is 50%. Since the motor drives the drum, the net acting ratio of the motor is substantially the same as the net acting ratio of the drum. In the present embodiment, it is considered that the net acting ratio of the motor is the same as the net acting ratio of the drum unless stated otherwise.

The tumbling operation of the drum refers to a motion in which the drum rotates at a speed of 40 to 46 RPM so that laundry (i.e., clothes) rises and falls repeatedly. The soaking and washing are performed with the mechanical force such as frictional force and impacting force acted on the laundry when the laundry falls to hit the surface of the drum. The tumbling operation is the primary motion of the drum because the laundry is stirred and agitated through the tumbling operation.

The filtration operation refers to a motion in which the drum rotates at a speed of 100 RPM and thus the laundry rotates in step with the rotation of the drum while being in close contact with the inner surface of the drum. During the filtration operation, the laundry is widely stretched over the inner surface of the drum and washing water absorbed in the laundry is separated from the laundry.

The spinning operation refers to a motion in which the drum rotates at a speed of 800 RPM and the laundry is dehydrated by the centrifugal force. The spinning is performed to generate a very strong centrifugal force at the final stage. With this, the washing course ends.

The rotation speeds (in units of RPM) of drum for the spinning operation, the filtration operation, and the tumbling operation decrease in this order. The spinning operation refers to a motion in which the drum continuously rotates in one direction. On the other hand, the tumbling operation and the filtration operation involve forward rotation, resting, and reverse rotation that constitutes one cycle.

For washing, washing water needs to be supplied to the washing apparatus from the outside. To this end, the washing apparatus is equipped with a water valve 23. The water valve is connected to an external water source. When the water valve opens, washing water is introduced into the washing apparatus.

The washing apparatus may be equipped with two or more water valves 23 as necessary. For example, the washing apparatus is equipped with two water valves, one may be a cold water valve 25 for controlling the flow of cold water externally supplied from an external water source, and the other is a pre-valve 24 for controlling the flow of non-cold water such as hot water supplied from a boiler.

When the temperature of washing water is set to the room temperature (or to cold or to chilly water), it is not necessary heat the washing water. In this case, only the cold water valve 25 acts to control the supply of washing water. When the temperature of washing water is not set to the room temperature but is set to a fixed temperature (for example, 25° C., 40° C., or the like), both of the pre-valve 24 and the cold water valve 25 are used to supply washing water. In this case, it is also possible that washing water is supplied only through the cold water valve 25.

Alternatively, both of the pre-valve 24 and the cold water valve 25 may be used to supply cold water. When washing water is supplied through the pre-valve 24, the washing water flows into the tub via the inside of the drum. On the other hand, when washing water is supplied through the cold water valve 25, the washing water directly flows into the tub without flowing through the inside of the drum. Alternatively, the valves and the flow paths of washing water may be opposite to the case described above.

The pre-valve 24 is a water valve that controls the flow of washing water supplied to the tub via a detergent box, and the cold water valve 25 is a water valve that controls the flow of washing water directly supplied to the tub without passing through the detergent box. Alternatively, the valves and the flow paths of washing water may be opposite to the case described above.

Therefore, the number of valves with which the washing apparatus is equipped may vary depending on the temperature of washing water and the flow path of washing wager.

The level sensor 26 senses the level of washing water in the tub. That is, the level sensor 26 is a sensor for controlling the water level such that an adequate amount of washing water can be supplied to the tub.

In most cases, the level sensor 26 may be a frequency sensor that detects the water level using a frequency of waves. The sensing of the water level is based on the principal that a frequency of waves that can be detected varies depending on a water level. The level sensor 26 can sense levels of water ranging from a maximum level which means that the tub is full of washing water to a minimum level (i.e., empty level) which means that no water is introduced into the tub. The maximum level is a heater protection level at which a lower portion of the drum is immersed in washing water so that the heater can be protected. Normally, water supply is continuously performed until washing water reaches a heater protection level after laundry is fully soaked.

In the present embodiment, the heater protection level may be destroyed. That is, the heater protection level can be neglected. Therefore, a maximum water level up to which water supply continues refers to a water supply level that is not the heater protection level. In the present embodiment, the term "water supply level" is defined as a water level at which a lower portion of the drum is immersed in washing water.

When measuring the level of water with a frequency level sensor, the frequency corresponding to the empty water level is about 25.5 Khz, and the frequency corresponding to the heater protection level is about 24 Khz. Specific frequency values representing various water levels vary depending on the size of an washing apparatus, the model name of a frequency sensor, and an external environment. However, among various frequency level sensors, it is common that a higher frequency represents a lower water level.

The controller 90 controls the operation of the water valve 23 on the basis of a water level value detected by the level sensor 26.

The induction module (i.e. IH module) 70 is a heater that heats the drum through electromagnetic induction. The induction module is described in detail in the specification of the preceding patent application. Therefore, a redundant description will be omitted herein.

The drum is heated by the induction module, and the washing water is heated by the drum. At this time, the laundry that is direct contact with the drum is also heated by the drum. With this heating mechanism, since the soaked laundry is directly heated, heating efficiency is improved. Moreover, a point that thermal diffusion does not occur also improves heating efficiency.

The heating with the induction module in a washing cycle is performed with the help of a water temperature sensor 28. When the temperature of the washing water reaches a preset temperature, the heating is stopped.

With the induction module, the drum can be heated to about 160° C. in a short time. For example, in about 3 seconds, the temperature of the outer circumferential surface of the drum may increase up to 160° C. Therefore, the heat in the drum should be transferred to the washing water and the laundry to prevent overheating of the drum or overheating of the induction module.

A drying temperature sensor 29 may be used to prevent overheating of the drum. The drying temperature sensor 29 may directly or indirectly sense the temperature of the outer circumferential surface of the drum. When it is determined that the drum is overheated on the basis of the temperature sensed by the drying temperature sensor 29, the controller 90 stops the operation of the induction module.

The washing temperature sensor 28 is mounted on the surface at a lower portion of the tub to sense the temperature of the washing water. The drying temperature sensor may be mounted on the surface of an upper portion of the tub and may sense the temperature of the outer circumferential surface of the drum. Therefore, temperature measurement targets differ according to positions where drying temperature sensors are installed.

The water temperature sensor 28 directly senses the temperature of the washing water. The drying temperature sensor 29 may indirectly sense the temperature of the drum in a non-contact manner. Therefore, sensing mechanisms or methods of both of the temperature sensors preferably differ from each other.

The water temperature sensor 28 is configured to sense the temperature of the washing water when the drum does not operate. The induction module may be controlled not to operate when a target temperature is reached. The drying temperature sensor 29 is configured to sense the temperature of the drum that is rotating. In particular, the drying temperature sensor may sense the temperature during the rotation of the drum and the operation of the induction module. Therefore, it is preferable that sensing points of both of the sensors are different.

Through such a dual sensor configuration, a safe washing apparatus and a control method thereof can be provided.

According to embodiments of the present invention, it is possible to provide a washing apparatus and a method of controlling the apparatus, both being capable of safely driving an induction module. In particular, driving of the drum and the driving of the induction module can be associated. Details of these embodiments will be described later.

The washing apparatus and the control method according to the present embodiments can perform effective washing with a significantly smaller amount of washing water than the amount of washing water required by conventional washing machines or control methods. That is, effective washing can be performed only with the amount of washing water which corresponds to a level much lower than the heater protection level.

In order for washing to be carried out effectively, sufficient detergent water (washing water in which detergent is dissolved) must be supplied to the laundry. That is, it is preferable that washing is carried out in a state in which the laundry can absorb and discharge detergent water at the same time. It will be apparent that when a portion of the laundry is not wet, this portion may not be washed. For this reason, washing has been performed with a water level being equal to the heater protection level.

However, in the present embodiment, the heater protection level is not required, and washing can be performed at a level much lower than the heater protection level. That is, washing may be performed in a state in which the laundry is not immersed in the washing water.

In this case, as the drum is driven, the detergent water absorbed by the laundry is forced to be discharged into the tub, and the washing effect is inevitably lowered. For this reason, in the present embodiment, it is preferable that the circulation pump 80 for supplying or resupplying detergent water to the laundry is provided.

The circulation pump 80 is a component that extracts a portion of the washing water from a lower portion of the tub and injects the extracted washing water into the laundry through the opening of the drum. The washing effect can be enhanced by the injection pressure of the washing water, and the washing water (detergent water) is re-supplied to the laundry so that the laundry is always sufficiently wet. Therefore, effective washing can be performed even if the laundry is not immersed in the washing water.

In the washing apparatus, a washing cycle involves initial water supply, soaking, heating, and main washing. After the main washing, rinsing and dehydrating may be performed. The entire washing process or course is automatically performed in the order of washing, rinsing, and dehydrating.

Additional water supply may be performed in the soaking step. The present embodiment can achieve the above-mentioned objectives especially when heating is performed in the washing cycle. The features of the washing cycle according to an embodiment of the present invention can be applied the subsequent rinsing cycle unless contradictory or exclusive.

Figure 6:
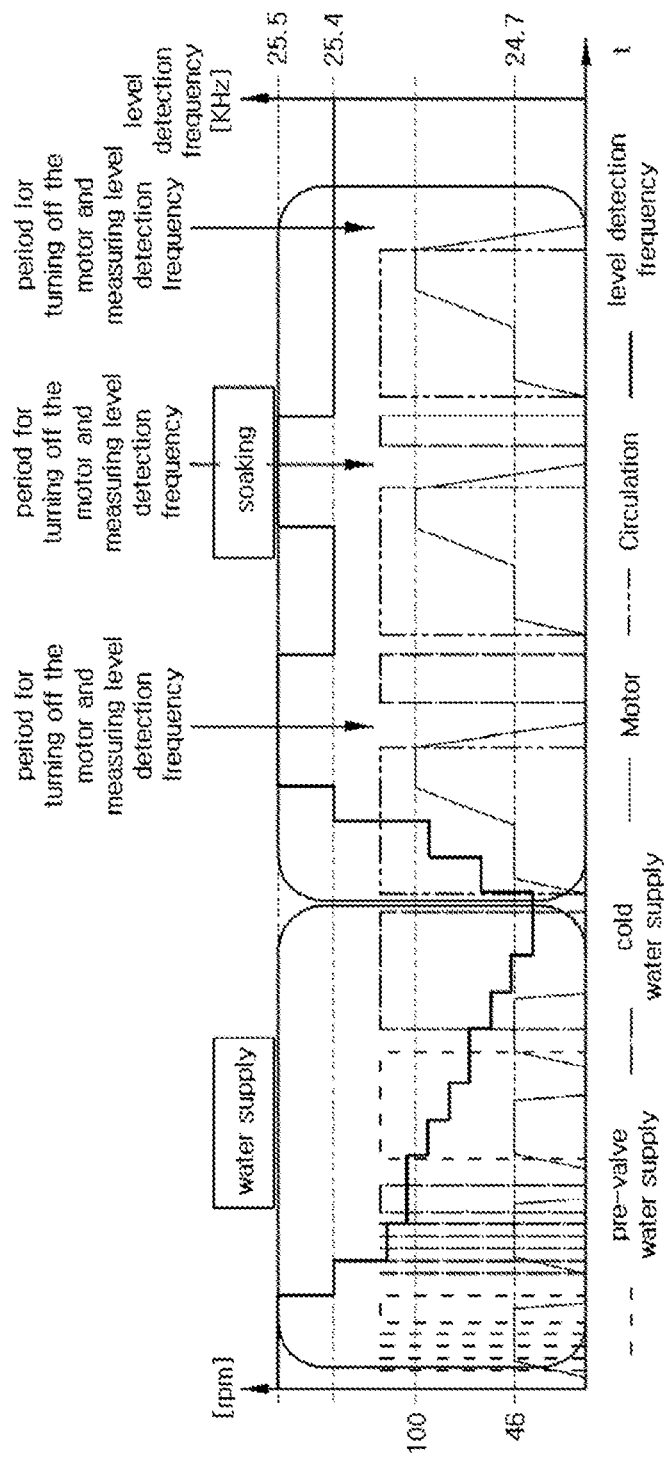
FIG. 6 is a diagram illustrating operations of the components to be controlled in either a water supply step or a soaking step during operation of the washing apparatus according to one embodiment of the present invention.
Figure 7:
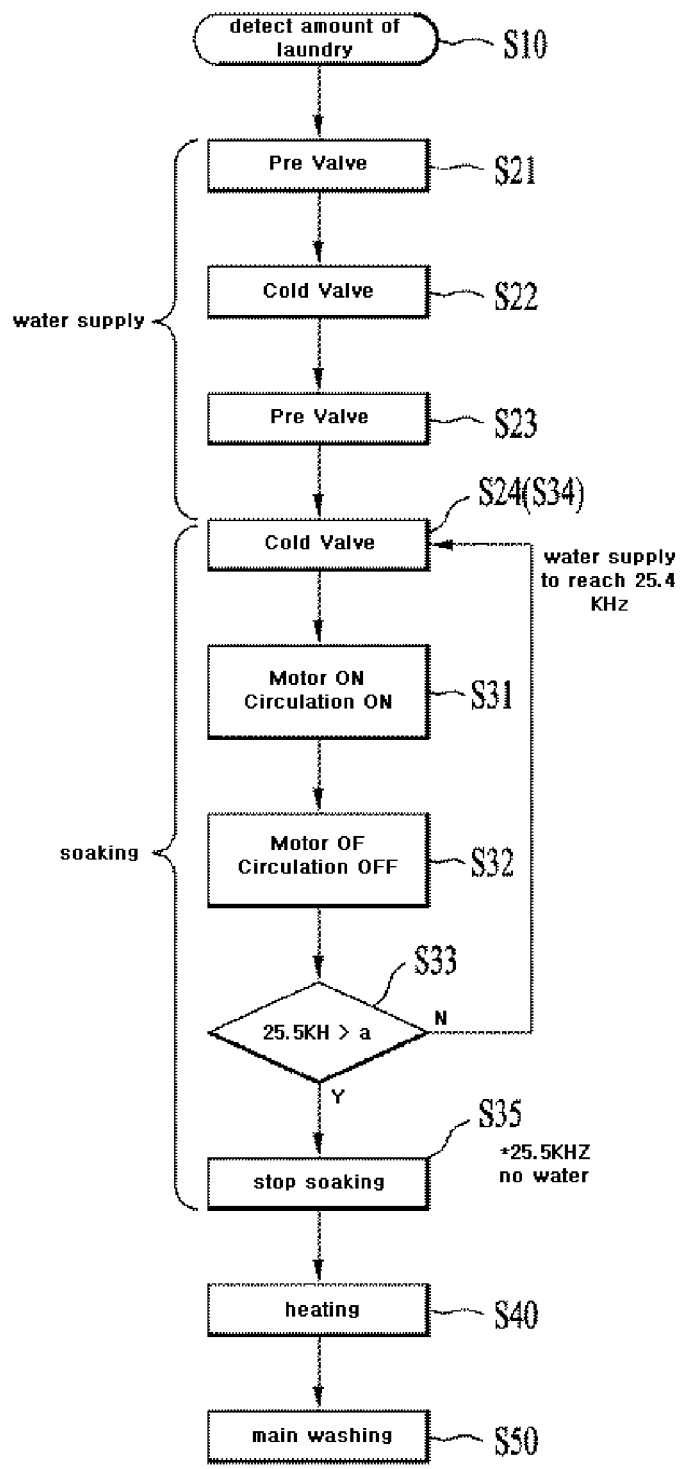
FIG. 7 is a flowchart illustrating a method of controlling a washing apparatus according to one embodiment of the present invention.

Herein after, a control method according to one embodiment of the present invention will be described in detail with reference to FIGS. 6 to 7. FIG. 7 shows the entire flow of a washing cycle, and FIG. 6 shows a way in which a control configuration (a water valve, a motor that drives a drum, a circulation pump, and a level sensor) works in a washing cycle, especially in a water supply session (step) and a soaking session (step) of the washing cycle.

First, the water supply session and the soaking session will be described below.

When a washing cycle starts, a drum is driven first and a laundry weight detection S10 is performed. As the amount of laundry is increased, the amount of required washing water is increased, and washing time is accordingly increased. When the weight of laundry is detected, an expected washing end time calculated on the basis of the detected weight of laundry will be presented.

When the amount of laundry is detected, a water supply step S20 is performed. The water supply step S20 is also referred to as initial water supply. In the water supply step S20, the drum performs tumbling, and the rotation speed of the drum in this step is approximately 46 RPM. When the motor is turned on, the rotation speed of the drum gradually increases until reaching 46 RPM and then the rotation speed of 46 RPM is maintained. When the motor is turned off, the rotation speed of the drum gradually decreases from 46 RPM and then the drum stops in a certain time. That is, even after the motor is turned off, the drum rotates for a predetermined time. When the drum stops after the motor is turned off, a predetermined resting period follows, and the motor is then turned on again. At this time, the drum may rotate in the opposite direction.

In the water supply step S20, the water valve 23 may alternately open and close repeatedly at regular intervals so that water supply may be performed intermittently. Alternatively, the water valve 23 may remain open for a predetermined period of time so that water supply may be continuously performed. In the water supply step S20, water supply may be performed multiple times. The on/off pattern or the on-time of the water valve 23 may differ for each water supply round. In FIG. 2, an example in which four times of tumbling and four times of water supply are performed is illustrated. The number of times of tumbling and the number of times of water supply may vary depending on the amount of laundry.

In the water supply step S20, "water supply S21 via the pre-valve 24" (hereinafter, referred to as pre-valve water supply) and "water supply S22 via the cold water valve 25" (hereinafter, referred to as water-valve cold water supply) may be sequentially performed. That is, the pre-valve water supply S21, the water-valve cold water supply S22, the pre-valve water supply S23, and the water-valve cold water supply S24 may be sequentially performed. In the water supply step S20, the final water supply may be the water-valve cold water supply S24.

After the water supply step S20 starts, the water level gradually rises. That is, the detected frequency decreases. In FIG. 2, a frequency of 25.5 Khz represents an empty level, and a frequency of 25.4 Khz represents a water level higher than the empty level. A frequency of 25.4 Khz specifically represents a minimum level defined in the present embodiment (for example, this water level corresponds to about one liter of washing water and is referred to as "circulation water level" hereinafter). In the present embodiment, a frequency of 24.7 Khz may represent a heater protection level that is used in the related art and refers to a water level at which a lower portion of the drum is immersed in washing water.

In the initial water supply step S20, the tumbling operation period and the water supply period may largely overlap. In other words, it is possible to reduce soaking time by supplying detergent water directly to the laundry.

It takes a certain time for dry laundry to absorb washing water. Therefore, the amount of water that is initially absorbed by dry laundry, of the washing water supplied in the water supply step S20, is relatively small. Therefore, when reaching the target water level, the water supply step S20 ends. In this step, the target water level may be similar to or lower than heater protection level used by conventional technology. The target water level is higher than the circulation water level. However, since the water level is expected to be lowered through laundry soaking, the target water level may be set to be the same as the heater protection level. Although not shown in FIG. 6, the water level may be sensed in the water supply step, and sensing of the water level is performed to determine the end point of the water supply process.

The water supply step S20 ends when detecting the target water level (approximately 24.7 Khz), the soaking step S30 is performed. The soaking step is a step in which laundry sufficiently absorbs the washing water.

In the present embodiment, the water level at the end of the water supply step S20 may be a water level at which laundry is not completely submerged in the washing water. At that water level, only a portion of the laundry that is in contact with the lower portion of the drum is immersed in the washing water. The soaking step S30 starts with the drum operating without performing additional water supply. Therefore, it is preferable that the circulation pump is driven while the drum is driven for soaking.

That is, when the water supply step S20 is finished with the water supply S24, it is preferable that the soaking step S30 starts by turning on the motor for rotating the drum and turning on the circulation pump.

At the end of the water supply step S20, the water level is higher than the circulation water level. This means that a sufficient amount of washing water for circulation is contained in the tub.

Drum operation includes tumbling. The drum operation also includes filtration.

The tumbling is performed for a predetermined time after the motor is turned on, and then the filtration follows without an interval between the tumbling and the filtration. That is, the drum rotates at 46 RPM for tumbling for a predetermined time, the drum then accelerates so that the rotation speed is raised to about 100 RPM, and the drum then rotates at 100 RPM for filtration for a predetermined time. The motor may turn off after the predetermined time has elapsed. An operation pattern in which the operation of the drum switches seamlessly from the tumbling to the filtration is referred to as a cycling operation. That is, the cyclic operation of the drum refers to an operation in which the filtration follows seamlessly the tumbling.

In an initial session of the cyclic operation, the circulating pump is driven and thus the water level gradually descends. This is because the laundry absorbs the washing water injected into the drum by the operation of the circulation pump. As the water level gradually descends, the amount of washing water required for operation of the circulation pump may not be maintained. Therefore, in a late session (filtration) of the cyclic operation, the laundry is slightly dehydrated or water dangling on the surface of the drum is separated. Through this filtration operation, washing water required for driving the circulation pump can be recovered.

Most of the washing water is absorbed by the laundry so that the laundry is soaking set through the cyclic operation and the circulation pump operation S31. When the laundry is soaked with an appropriate amount of washing water, since the rotation speed RPM of the drum during the filtration operation is not excessively high, it does not happen that the laundry is completely dehydrated by centrifugal force.

The motor and the circulation pump are turned off after the first round operation of the drum and the circulation pump is finished (S31). That is, the operation session of the drum and the circulation pump ends (S32). The motor and the circulation pump may be synchronized in their operation. Alternatively, when the motor is turned off, the drum may further rotate for a very short time to stop. This is because of inertia. When the drum operation is completely stopped after the motor is turned off, the water level is measured (S33). This is to measure the water level accurately when the water surface is calm. After the first round operation of the drum and the circulation pump, the measured water level may be equal to the empty level.

When the sensed water level is equal to the empty level or lower than the circulation water level, that is, when the frequency detected by the level sensor is 25.5 Khz or higher than 25.4 Khz, additional water supply for the first round may be performed. The additional water supply may be performed via the water valve 23. That is, the water-valve cold water supply S24 that is the final stage of the water supply step S20 is performed via the water valve S25. To differentiate this additional water supply, this event will be designated by S34 while the water supply in the soaking step is designated by S24. The additional water supply S34 may be performed until reaching the circulation water level. That is, for example, water supply may be performed until the level sensor 26 senses 25.4 Khz.

After the additional water sensing S33 is performed, the second round operation of the drum and the circulation pump is performed again (S31). Here, it is noted that the water level at which the circulation pump starts is the target water level of the additional water supply, which is set for the soaking step S30.

The second round operation of the drum and the circulation pump is similar to the first round operation of the drum and the circulation pump. When it is necessary to measure the water level, the level sensing S33 is performed again. Of course, the operation of the drum and circulation pump may be restarted.

In the soaking step S30, the drum and circulation pump driving S31, the motor and circulation pump off S32, the water level sensing S33, and the additional water supply S34 may be repeated again and again. The repetition may be performed until the water level sensing S33 detects the circulation water level and no further water supply is required. That is, when the additional water supply is repeatedly performed up to the circulation water level, and the water level is no longer lowered from the circulation water level, the soaking step ends.

In other words, the soaking step S30 ends (S35) when the circulation water level is detected after the cyclic operation. That is, the soaking step S30 is performed until the point at which the laundry no longer absorbs the washing water (the point at which the absorption of washing water by laundry and the discharge of the washing water from the laundry are balanced) even though the washing water is pumped to the laundry by the circulation pump.

A case where the bottom of the drum is in contact with the washing water means that about 2 liters of washing water is supplied to the tub to form a water level of, for example, 24.9 Khz. A case where a lower portion of the drum is immersed in the washing water and a portion of the laundry in the drum is immersed in the washing water, means that approximately 3 to 4 liters of washing water is supplied to the tub to form a water level of, for example, 24.7 Khz. On the other hand, the circulation level means a state in which approximately 1 liter of wash water is supplied to the tub. That is, the circulation water level (for example, 25.4 Khz) may be higher than the empty level (for example, 25.5 Khz) and correspond to an amount of washing water that is smaller than one liter of washing water.

As described above, about 1.5 liters of wash water is required to smoothly drive the circulation pump. However, 1.5 liters of washing water is the amount of washing water required to drive the circulation pump during normal tumbling operation.

In the present embodiment, when the circulation pump is driven, it is more preferable that the drum performs the cyclic operation. Since the cyclic operation includes the filtration operation, it is promoted that the washing water is collected in a lower portion of the tub, so that the circulation pump can be smoothly driven even with a relatively small amount of washing water.

The circulation water level means the amount of washing water, which is 1 liter smaller than the amount of washing water corresponding to a water level at which bottom of the drum is in contact with the washing water, and also means the amount of water, which is 2 to 3 liters smaller than the amount of washing water corresponding to the heater protection level. In addition, the circulation water level equals to the empty level plus 1 liter of washing water.

Therefore, in the present embodiment, it is seen that a relatively small amount of washing water is stored in the tub after the completion of the soaking. In other words, even with a relatively small amount of washing water compared to common practices, the soaking can be reliably performed, and the subsequent heating and main washing can also be performed.

In conventional washing machines, the amount of washing water that is required to be stored in the tub after the soaking step is an amount corresponding to the heater protection level. However, in the present embodiment, the amount of washing water required to remain in the tub is only to amount corresponding the circulation level. That is, according to the present embodiment, the amount of residual washing water in the tub after the soaking is significantly smaller than that in the related art. Even when the amount of washing water remaining in the tub is only 1 liter that is smaller than the amount of washing water (about 1.5 liters) remaining in the circulation pump and the circulation passage after the soaking, subsequent steps such as water heating and main washing can be effectively performed.

In the case of the operation of the circulation pump and the tumbling operation of the drum, about 1.5 liters of washing water must remain in the tub, and in the case of the filtration operation, about 1 liter of washing water must remain. In particular, it is possible to improve the soaking efficiency and to ensure effective driving of the circulation pump by performing the cyclic operation with about 1 liter of residual washing water.

Here, it can be seen that the amount of washing water required for washing is very effective for washing efficiency and energy saving.

First, washing can be performed with high-concentration detergent water. When a large amount of washing water is required, the amount of detergent is inevitably increased for the optimum concentration of detergent water. In many cases, washing may be performed with lower concentration of detergent water than that required. However, in the present embodiment, since the amount of washing water is reduced by about 2 to 3 liters, washing with high concentration of detergent water is possible. Due to this, the washing performance is improved. Assuming that the washing apparatus is used about 3 to 4 times a week, the amount of water saved will also be substantial.

Next, it is possible to increase the heating efficiency as described below. When heating the washing water or laundry, a lot of heat energy is consumed. This is because the heat capacity of water is relatively large. Therefore, as the amount of washing water to be heated is decreased, effective energy saving can be achieved. That is, the amount of energy required to heat washing water to the target temperature is reduced. In other words, with the same amount of energy, and it is possible to heat to a higher temperature.

For example, it is possible to heat washing water to a temperature of 52° C. with the same amount of energy that is used to heat washing water to a temperature of 40° in conventional washing machines. Therefore, when the same energy is consumed, it is possible to improve washing performance by using higher temperature of washing water.

For this reason, according to the present embodiment, it is possible to improve the washing efficiency by chemical effect of detergent and high temperature. In addition, the effect of reducing the washing time and the effect of promoting washing by mechanical force may be more pronounced in the heating step described below.

As shown in FIG. 7, a heating step S40 and a main washing step S50 may be performed after the soaking step S30.

Alternatively to the method described above, in the soaking step S30, a squeezing operation may be performed. The squeezing operation refers to an operation in which the motor 41 rotates the drum 30 at high speeds so that the laundry remains in close contact with the inner circumferential surface of the drum 30 due to centrifugal force, and then the motor rotates the drum 30 at much lower speeds so that the laundry separates from the inner circumferential surface of the drum 30. That is, the squeezing operation refers to an operation in which a cycle composed of the high speed rotation of the drum and the low speed rotation of the drum repeats. That is, the drum rotates at high speeds to perform filtration and then rotates at low speeds to perform tumbling. This cyclic operation is called squeezing operation.

When the squeezing operation is performed, the washing water is separated from the laundry by centrifugal force while the drum performs the filtration operation, and the washing water is sufficiently supplied to the laundry while the drum performs the tumble motion. The filtration operation is a process of securing or recovering sufficient washing water required to drive the circulation pump, and the tumble motion is a process of supplying a sufficient amount of washing water to the laundry by driving the circulation pump. Of course, the circulation pump is driven throughout the squeezing operation. The amount of washing water discharged from the laundry is larger than the amount of washing water supplied to the laundry during the filtration operation, but the amount of washing water supplied to the laundry is larger than the amount of washing water discharged from the laundry during the tumbling operation.

Hereinafter, the heating step S40 performed after the soaking step S30 will be described in detail with reference to FIGS. 8 to 11.

Figure 8:
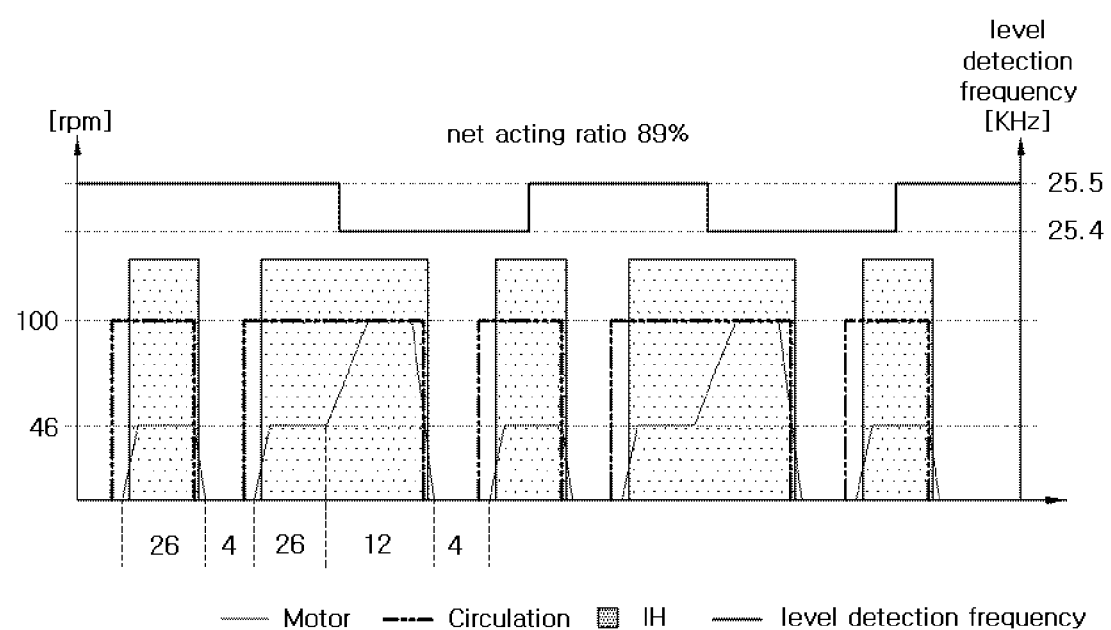
FIG. 8 is a diagram illustrating operations of components of the washing apparatus to be controlled in a heating step.
Figure 9:
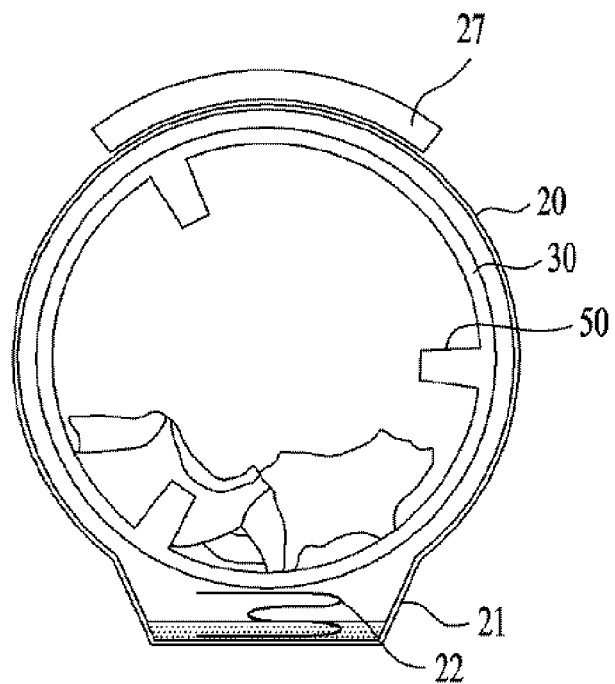
FIG. 9 is a view illustrating a drum that is not operating.
Figure 10:
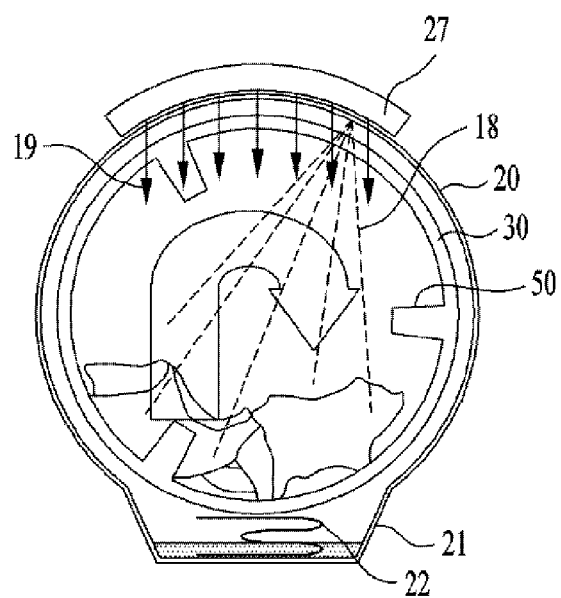
FIG. 10 is a view illustrating a tumbling operation of the drum.
Figure 11:
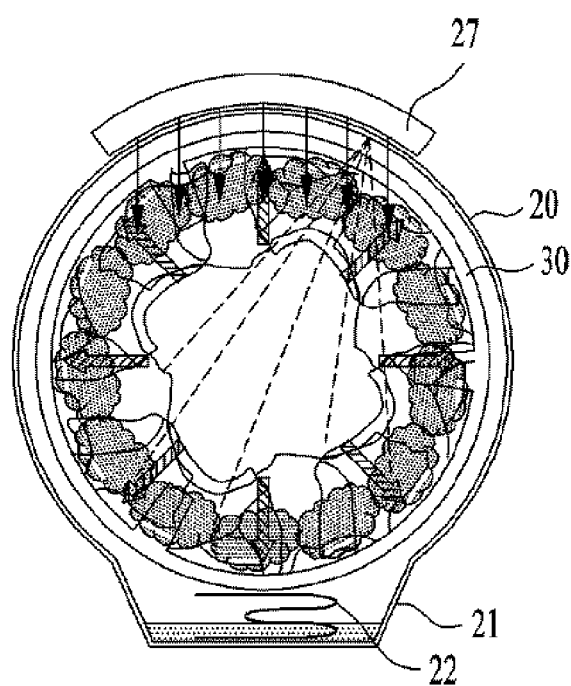
FIG. 11 is a view illustrating a filtration operation of the drum.

FIG. 8 shows a driving state of each of the motor, the circulation pump, and the induction module and water level changes in the heating step. FIGS. 9 to 11 respectively show a state where the drum stops operating, a state where the drum performs a tumbling operation, and a state where the drum performs a filtration operation.

In the present embodiment, as illustrated in FIGS. 9 to 11, the tub 20 may not have the heater mounting portion 21, and the heater 22, that is, the sheath heater may not be provided. However, the conventional tub may be used without a design change. The heater 22 is illustrated because it can be used in any session other than an induction heating session. On the other hand, the illustration of the heater 22 shows that the heater protection water level can be destroyed or ignored in the present embodiment.

Accordingly, the washing water heating in the present embodiment is performed with an induction heater, and a sheath heater can be provided under the tub unless contradicted to the present embodiment. That is, the washing apparatus according to the present embodiment may include both an induction heater and a sheath heater, or may include only the induction heater of the two heaters. A mode in which washing water is heated by a sheath heater as in a conventional apparatus may be used, and a mode in which wash water is heated by an induction heater without using the sheath heater may be used.

In the soaking step S30, the soaking is completed after the water supply is completed. That is, no more water supply is performed, and the laundry is in a state of fully soaking.

After the soaking step S30, a heating step S40 may be performed so that washing can be performed at high temperatures. In this heating step S40, the drum is heated by the induction module (IH module) 70. Therefore, it is preferable that the induction module is always turned on while the drum is rotating.

As illustrated in FIG. 9, it is preferable that the induction module 70 is off when the drum does not operate. In this state, it is preferable that the circulation pump also does not operate. The induction module 70 may be provided on an upper portion of the tub, and laundry is not placed in an upper portion of the drum facing the induction module 70. Therefore, a specific portion of the drum may overheat while the drum 30 stops rotating. This is because heat cannot be transferred to the laundry or washing water. Therefore, it is preferable that the induction module 70 is always turned off when the operation of the drum is stopped.

In the heating step S40, the drum is driven to evenly heat the washing water and the laundry. The operation of the drum may include tumbling operation and filtration operation. Further, the operation of the drum may include tumbling operation and cyclic operation. The tumbling operation and the circulating driving may be performed sequentially or alternately.

As illustrated in FIG. 10, while the drum 30 rotates to perform a tumbling operation, the laundry lifted by the lifter 30 falls by gravity, and the circulation water is injected into the drum. In addition, the induction module is driven to heat the drum.

As illustrated in FIG. 11, when performing filtration operation, or when performing filtration operation in a cyclic operation, the drum rotates and the laundry also rotates while being in close contact with the inner circumferential surface of the drum. This is because the centrifugal force caused by the rotation of the drum is stronger than the gravity. At this time, circulation water may be injected into the drum, and the induction module may be driven to heat the drum.

FIGS. 10 and 11 illustrate a state 18 in which the washing water is circulated and injected into the drum from above the drum and a state 19 in which the induction module is driven to generate a variable magnetic field that is applied to the drum. Changes in magnetic field generate an eddy current flowing through the drum, and thus the drum is heated by the eddy current.

Therefore, as illustrated in FIGS. 9 to 11, the heater protection water level is destroyed through the entire heating period so that the water level will always be lower than the bottom of the drum, that is, below the circulation water level.

During the tumbling operation and the cyclic operation, the induction module 70 may operate and the circulation pump 80 may operate. Washing water is injected into the drum and is sprayed onto the heated laundry in drum due to the operation of the circulation pump 80. Therefore, the heat of the heated drum can be effectively transferred to the washing water and the laundry. That is, driving of the drum, heating, and driving of the circulation pump are simultaneously performed.

As illustrated in FIG. 8, an operation period in which the drum rotates coincides with an operation period in which the circulation pump operates. Since the starting of the circulation pump is synchronized with the starting of the motor, the rotation of the drum and the operation of the circulation pump can be substantially simultaneously performed. However, when the motor is turned off, the drum continues its rotation for a short time due after the motor is turned off due to the inertia. The circulation pump can be turned off synchronously when the motor is turned off. Alternatively, the circulation pump may be turned off when the drum stops rotating.

An operation period of the drum may coincide with an operation period of the induction module. However, it is preferable that the induction module is turned on after the drum starts rotating, and the induction module is turned off before the drum stops rotating.

Therefore, an operation period of the drum includes or entirely overlaps an operation period of the circulation pump or an operation period of the induction module.

When the motor is turned on, the rotation speed of the drum increases to the target speed and then the target rotation speed is maintained. When the rotational speed of the drum is lower than that required, some regions of the drum may heat up rapidly. Therefore, it is preferable that the induction module is turned on when the drum rotates at or above a predetermined rotation speed after the motor is turned. This prevents overheating of the drum.

Likewise, it is preferable that the induction module is not turned on until the drum is completely stopped. This is because the drum may be locally rapidly heated when the drum stops rotating. Therefore, it is preferable that the induction module is turned off when the rotation speed of the drum is lower than a certain speed after the motor is turned off. It is not desirable to turn off the induction module after the motor is turned off. Since the drum rotates due to the inertia force after the motor is turned off, it is desirable to reduce the overall heating time by still performing heating even in a period in which the drum rotates by inertia. And it is desirable to turn off the induction module when the rotation speed of the drum decreases to a certain speed before the drum stops completely. Here, the drum rotation speed at which the induction module is turned on when the drum rotation is accelerated may be the same as the drum rotation speed at which the induction module is turned off when the drum rotation is decelerated. It may be about 15 RPM. That is, the threshold rotation speeds RPM may be the same when the induction module is turned on and the induction module is turned off. If the threshold speed RPM is lowered, the heating efficiency can be improved, but there is a risk of overheating. Conversely, when the threshold speed RPM is increased, the heating efficiency is reduced but a risk of overheating is reduced. Therefore, it is possible to control the operation of the induction module by setting the threshold speed RPM to about ⅓ of the tumbling speed RPM.

Therefore, the on/off timing of the motor and the on/off timing of the induction module may be different.

According to the present embodiment, in the heating step S40, the heater protection level is meaningless as described above. As illustrated in FIG. 8, effective heating is possible even when the water level in the heating step fluctuates between the empty level and the circulation water level. The illustrated water level change is an example and the water level may differently fluctuate between the empty level and the circulation water level. When the target temperature of the washing water is lower than 60° C., the amount of water evaporated is not significant. This is because evaporation and condensation occur simultaneously.

According to the present embodiment, the overheating prevention in the washing apparatus is not related to the amount of washing water and it may be implemented by controlling the operation of the induction module. Therefore, in the heating step S40, the net acting ratio of the motor can be increased. For example, the net acting ratio of the motor can be set in a range of 80% to 90%. That is, the net acting ratio of the motor in the heating step is about 13% in conventional washing machines, but the net acting ratio of the motor in the washing apparatus is very high.

The mechanical force capable of enhancing the washing effect can be provided more by increasing the net acting ratio. In addition, due to the nature of the induction module, it is possible to rapidly reach the target temperature. That is, it results in an increase in the mechanical force, an increase in the heating efficiency, saving of energy, and a reduction in the heating time. Since the protection level is meaningless, it is possible to control the net acting ratio of the motor regardless of the water level in the tub in the heating step.

In the heating step S40, the drum can perform a tumbling operation and a cyclic operation. Specifically, the tumbling operation may be first performed and the cyclic operation may then be performed. This operation pattern may be repeated. That is, the heating step S40, the operation pattern is repeated until the water temperature sensor senses the target temperature.

The water level in the heating step S40 will fluctuate between the empty level and the circulation water level.

When only the tumbling operation is performed, a relatively large amount of washing water is required to drive the circulation pump as described above. When performing the filtration operation, excessive heat is transferred to the laundry, which may cause thermal damage to the laundry. Therefore, it is not preferable to perform only the tumbling operation or to alternate the tumbling operation and the filtration operation.

In the present embodiment, the tumbling operation and the cyclic operation may be repeated. Therefore, if the circulation pump can be driven with only a small amount of washing water, it is possible to effectively heat the laundry while prevent the laundry from overheating.

It is preferable that in the cyclic operation, a time period for the tumbling operation is longer than a time period for the filtration operation.

The longer the tumbling time, the more evenly the laundry and washing water will be heated. Therefore, it is possible to increase the washing effect through heating. However, in this case, the washing water for circulation may be insufficient. Therefore, the filtration operation must be performed for a suitable time. As the filtration time increases, the fear that the washing water is insufficient for circulation decreases. However, the time for which the laundry remains in contact with the surface of the drum increases, and thus the laundry may be overheated.

Therefore, the distribution of the tumbling time and the filtration time must be appropriate to prevent overheating of the laundry, to secure a sufficient amount of washing water for driving the circulation pump, and to improve heating and washing performance. In FIG. 8, for example, a set of 26 seconds of tumbling operation, 4 seconds of resting, and 38 seconds of cyclic operation is repeated. Also, as an example, it is shown that the cyclic operation includes 26 seconds of tumbling operation and 12 seconds of filtration operation. According to the present embodiment, the tumbling time is longer than the filtration time, and specifically, the tumbling time is preferably 2 or more times longer than the filtration time. It is preferable that the tumbling operation and the cyclic operation are performed alternately.

Meanwhile, in the above-described embodiment, an example in which the filtration operation, the tumbling operation, and the cyclic operation are performed in the heating step has been described.

In the heating step, the squeezing operation or driving may be performed. This means that the drum repeats acceleration and deceleration thereof. That is, after the drum rotates at a high speed such that the laundry rotates in contact with the inner surface of the drum, the drum rotates at a low speed such that the laundry separates from the inner surface of the drum. That is, by periodically accelerating and decelerating the rotation speed of the drum, the laundry can be repeatedly discharged and absorbed.

The high-concentration detergent water passes through the laundry, thereby improving chemical washing performance with the use of the high-concentration detergent.

Therefore, in each embodiment, the heating step includes a session (i.e., filtration period) in which laundry rotates together with the drum while being in close contact with the inner surface of the drum and a session (i.e., tumbling period) in which the laundry is lifted and dropped.

Hereinafter, referring to FIG. 12, an embodiment regarding overheating prevention in the heating step will be described in detail.

When water supply finishes, the induction module is driven to heat the drum. The laundry contained in the drum is heated by the heated drum.

The induction module is installed to face only a portion of the outer surface of the drum. Therefore, when the induction module is driven while the drum does not rotate, only a portion of the drum can be heated. In particular, when the induction module is installed to face an upper portion of the drum, it is difficult for the heated drum to transfer heat to the laundry or the washing water. Therefore, in the present embodiment, the driving of the drum and the driving of the induction module may be interlocked. In particular, the driving period of the drum may include or be equal to the driving period of the induction module.

On the other hand, the drum accelerates when the motor is turned on and starts driving, and decelerates to stop when the motor is turned off. Therefore, the rotation speed RPM at a start point of the operation of the drum and the rotation speed RPM at an end point of the operation of the drum are very low. Therefore, it is preferable that the induction module is not driven at the start and end points of the driving period of the drum.

Figures 12, 13, 14:
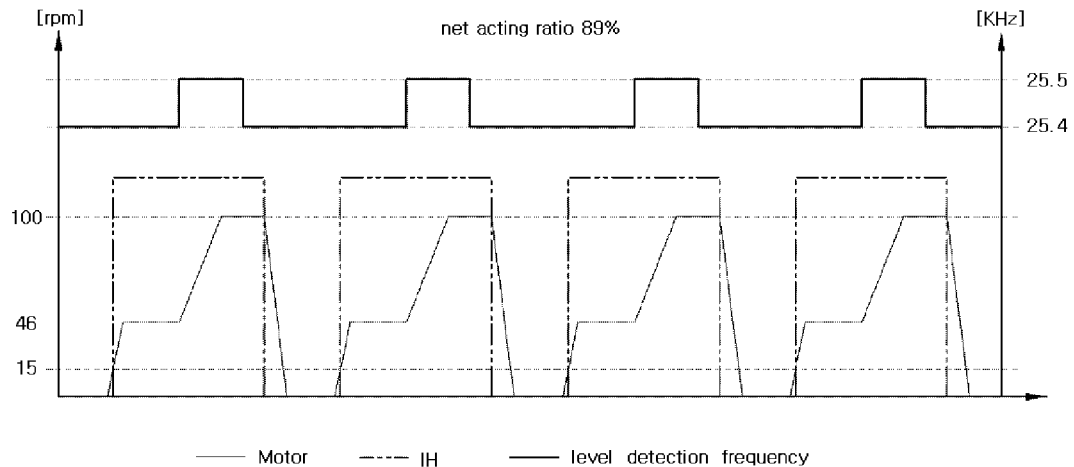
FIG. 12 is a diagram illustrating a relationship between the operation of the drum and the operation of the induction module when the induction module is in a safety driving mode.
FIG. 13 is a diagram illustrating correlations among washing performance, water volume, washing temperature, washing water circulation, and drum driving in a conventional washing machine.
FIG. 14 is a diagram illustrating correlations among washing performance, water volume, washing temperature, washing water circulation, and drum driving in a washing apparatus according to one embodiment of the present invention.

FIG. 12 shows an example in which the drum accelerates to a rotation speed of 15 RPM and the induction module is driven when the drum rotates at 15 RPM. Likewise, the drum may decelerate so that the induction module is turned off when the rotation speed of the drum is about 15 RPM. Since the rotation speed RPM of the drum is expected to increase through the acceleration of the drum, the induction module is driven. However, the rotation speed RPM of the drum is expected to decrease after the deceleration of the drum. Therefore, it is preferable that the induction module and the motor are turned off in synchronization. This is because heating the drum is ultimately to heat the laundry and the washing water, not heating the drum itself.

Through the correlation between the driving period of the drum and the driving period of the induction module, effective heating of the drum can be achieved and overheating of the drum can be prevented. In addition, the overheating of the laundry can also be prevented.

FIG. 12 does not illustrate the driving of the circulation pump. However, the driving of the circulation pump illustrated in FIG. 8 may be applied as it is.

It is preferable that the driving period of the circulation pump is substantially the same as the driving period of the induction module. This is because the washing water is delivered to the drum and the laundry by the circulation pump. Since washing water having the lowest temperature is supplied to the drum having the highest temperature, overheating of the drum and the laundry may be prevented.

Meanwhile, in addition to a method of controlling driving of the induction module and a method of controlling driving of the induction module through association between the driving of the drum and the operation of the circulation pump, a method of increasing stability is required. To this end, the above-described drying temperature sensor may be provided.

Even while the induction module is operating, the induction module may be forcibly turned off when the drying temperature sensor detects overheating of the drum. That is, the induction module may be forcibly turned off even when the induction module is driven in association with the driving of the drum. At this time, it is preferable that the driving of the drum continues.

For example, in a case where the drum is set to continuously operate for 36 seconds, if the drying temperature sensor senses overheating of the drum at a time when 30 seconds of the 36 seconds elapses, the operation of the induction module is immediately stopped off. In this case, the operation of the motor may continue for the remaining 6 seconds. That is, in a case where the operation of the drum is maintained even though the induction module is forcibly turned off, the heat of the drum can be effectively transferred to the laundry and the washing water. In addition, the driving of the circulation pump may be controlled in the same manner as the driving of the drum. That is, the drum and the circulation pump may be controlled to continuously operate for preset times even though the induction module is forcibly turned off.

Hereinafter, with reference to FIGS. 13 and 14, the washing performance (shown in FIG. 13) of the conventional washing machine is compared with the washing performance (shown in FIG. 14) of the washing apparatus according to the present embodiment. Particularly, the washing performances depending on the amount of washing water, washing temperature, driving factors of the circulation pump, and driving factors of the drum in the heating step are compared.

The fourth column in FIG. 13 shows washing performance and conditions in a standard washing course of a conventional washing machine.

Standard washing conditions mean that washing water is increased to a temperature of 40° C. in the heating step and the amount of required washing water except for washing water for laundry soaking is 2 to 4 liters. As described above, in this case, the driving of the circulation pump must be limited or excluded regardless of the driving pattern of the drum. The washing performance under the standard washing conditions is assumed to be 100% which is called standard washing performance.

From the second and third columns, it is seen that the heating step cannot be performed because the amount of washing water is smaller than the reference condition, and thus, the driving of the circulation pump is restricted regardless of the driving pattern of the drum. Therefore, the washing performance is inevitably lower than the standard washing performance.

From the fifth column, it is seen that the driving of the circulation pump is restricted regardless of the driving pattern of the drum in the heating step because the amount of washing water is larger than the reference condition. Since the amount of washing water increases, the washing water is heated to a temperature of about 34° C. that is lower than 40° C. with the same amount of energy. Therefore, since the temperature of the washing water and the concentration of detergent in detergent water are lower than reference conditions, the washing performance is lower than the standard washing performance.

The fourth column of FIG. 14 shows washing performance and conditions in a standard washing course of the washing apparatus according to the present embodiment.

There is no big difference in the washing performance between the conventional washing machine and the washing apparatus of the present embodiment under reference conditions. This is because the circulation pump can be driven in the heating step and the net acting ratio of the motor can be increased, and running rate of the motor can be further increased, but the temperature condition and the detergent concentration condition are similar. The fifth column shows similar results.

However, the washing apparatus according to the present embodiment uses a smaller amount of washing water than the conventional washing machine. In addition, according to the present embodiment, the heating can be performed with about 0 to 1 liter of washing water. This condition is shown in the third column. It is the optimum condition in the present embodiment.

Since the amount of washing water is reduced, it is possible to heat the washing water to a higher temperature with the same amount of energy and increase the concentration of detergent in the detergent water. In addition, the circulation pump can be driven according to the driving pattern of the drum. Therefore, economical and effective washing is possible, and enhanced washing performance can be achieved.

When there is little residual water as illustrated in the drawing, the heating temperature can be increased, which may result in washing performance similar to the reference performance.

In the washing apparatus according to the above-described embodiment, it has been described that the concept of the heater protection water level is ignored or considered. That is, according to the present embodiment, it can be seen that the amount of washing water used for washing can be significantly reduced.

Therefore, the washing apparatus according to the present embodiment does not exclude embodiments in which the amount of washing amount used for washing is larger than the amount of washing water used in the present embodiment and is smaller than the amount of washing water used in the conventional washing machine. For example, the water level in the heating step may be a level at which a portion of the lowermost end of the drum can be immersed in the washing water. That is, the washing apparatus according to the present embodiment includes a washing apparatus in which the circulation pump is driven in the heating step at a lower level than the heater protection level used in the conventional washing apparatus.

Figure 15:
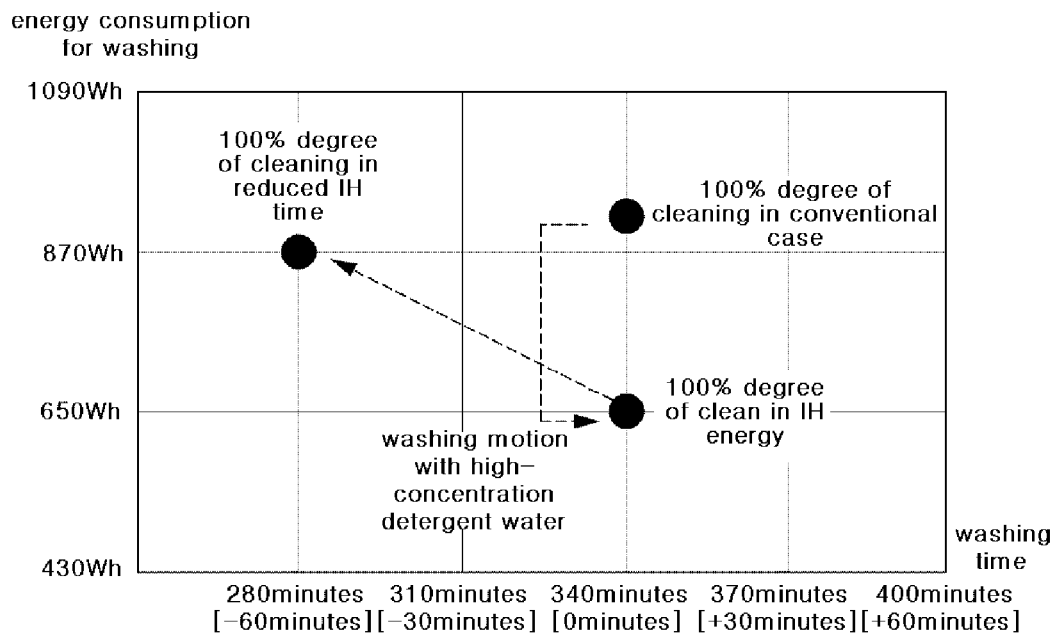
FIG. 15 is a diagram illustrating relationships among washing performance (degree of cleaning), washing time, and energy consumption in a washing apparatus according to the embodiment of the present invention.

Hereinafter, factors affecting the cleaning degree, and washing time and washing energy in a high-concentration washing step will be described with reference to FIG. 15. FIG. 15 is a view showing washing time and washing energy used in a washing apparatus according to one embodiment of the present invention and a conventional washing machine.

The cleaning degree indicates the extent that contaminants can be removed from laundry. When the cleaning degree is 100%, it means that all contaminants on laundry are removed. A more efficient washing cycle may be performed by making efforts to reduce energy and washing time required to achieve such a cleaning degree through a washing cycle.

The factors that determine the degree of cleaning are largely the concentration of the detergent and the temperature of the washing water. When comparing under the assumption that all other conditions are the same, the higher the concentration of the detergent, the higher the cleaning degree, and the lower the concentration of the detergent, the lower the cleaning degree. In addition, the cleaning degree increases as the temperature of the washing water increases, and the cleaning degree decreases as the temperature of the washing water decreases.

As described above, the degree of cleaning depends on the concentration of the detergent and the temperature of the washing water. According to embodiments of the present invention, when the cleaning degree is 100%, the energy consumption for washing and the washing time are remarkably reduced as compared with the case of using a conventional heater.

First, in order to achieve the same cleaning degree of 100%, conventional washing machines required washing time of 340 minutes and electric energy of 890 Wh. On the other hand, according to the present embodiment, in order to achieve the same cleaning degree of 100%, energy consumption was 870 Wh and washing time was 260 minutes. Although a reduction in the energy consumption is not significant, the washing time is dramatically reduced by as much as 60 minutes. This is a good result when the washing apparatus according to the present embodiment aims at achieving the shortest washing time.

Next, an example in which the energy reduction is the goal of the washing apparatus according to the present embodiment will be described. In order to achieve the same cleaning degree of 100%, the energy consumption of the washing apparatus was 650 Wh when washing time was 340 minutes which is the same as that of a conventional washing machine. This means that the energy consumption is reduced by about 240 Wh as compared to a conventional washing machine.

Therefore, according to the present embodiment, it is possible to achieve reasonable energy consumption and washing time by compromising the time reduction target and energy saving target.

Figure 16:
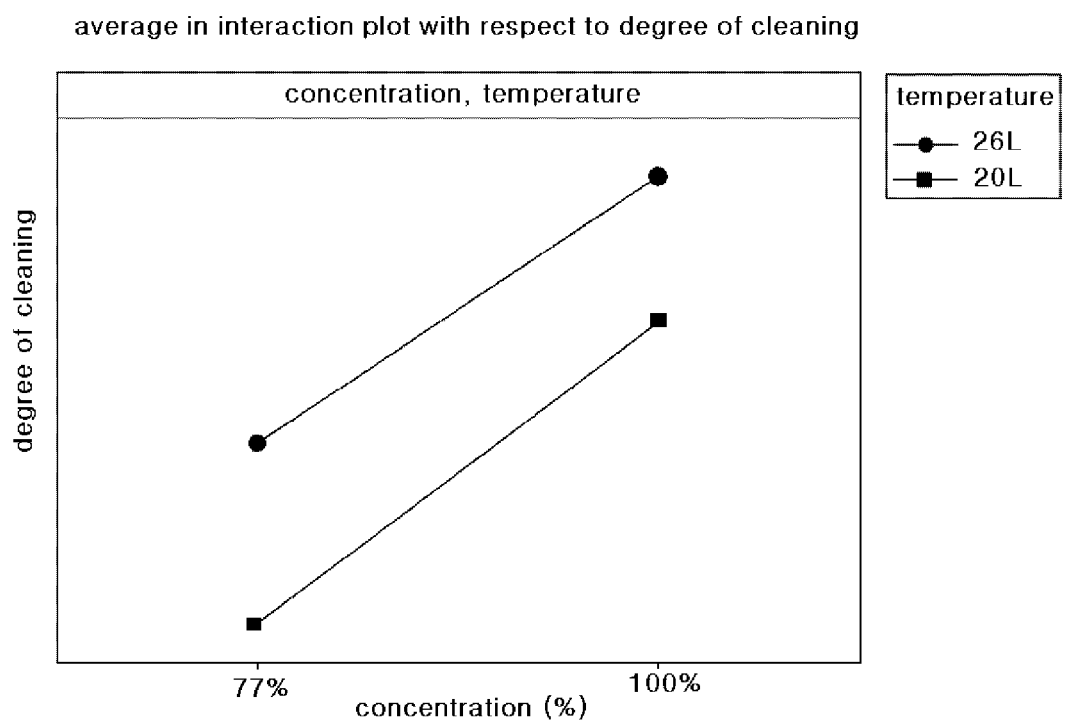
FIG. 16 is an interaction plot showing a relationship the temperature of washing water and the concentration of detergent.

FIG. 16 is a view showing relation between a concentration factor and a temperature factor to achieve a certain degree of cleaning.

Referring to FIG. 16, an interaction plot based on the degree of cleaning will be described. The factors influencing the degree of cleaning are the concentration of detergent in detergent water and the temperature of washing water. From the graph showing interactions between the detergent concentration and the washing water temperature, it can be seen that the same slope is maintained although the amount of washing water varies.

This means that the effect of the concentration of the detergent on the cleaning degree and the effect of the temperature of the wash water on the cleaning degree are independent of each other. This means that there is no interaction between the concentration of the detergent and the temperature of the washing water with respect to the cleaning degree.

Therefore, according to the present embodiment, the concentration of the detergent can be increased by reducing the amount of washing water. In this case, the amount of washing water is reduced, the temperature of the washing water can be increased more effectively by using less energy. In particular, because the effect of the detergent concentration on the cleaning degree is greater than the effect of the temperature of the washing water on the cleaning degree (approximately detergent concentration effect 64:temperature effect 36), it is possible to further reduce the energy required for heating to achieve the target cleaning degree.

As described above, according to the present embodiment, it is possible to implement laundry washing logic or laundry washing conditions that cannot be implemented in a conventional washing apparatus, thereby enabling very economical and effective laundry.

Embodiments will be described below.

First Embodiment

A first embodiment of the present invention is a method of controlling a washing apparatus constructed such that an induction heater mounted on a tub heats a drum containing laundry, the method including:
- a water supply step of supplying washing water containing detergent into the drum;
- a soaking step of soaking laundry contained in the drum with the washing water; and
- a heating step of heating the washing water and the laundry by heating the drum with the induction heater while rotating the drum and pumping the washing water into the drum from the tub with a circulation pump.

Second Embodiment

In the first embodiment,
in the heating step, the drum periodically accelerates and decelerates at regular time intervals.

Third Embodiment

In the first embodiment,
in the heating step, the drum alternately accelerates and decelerates.

Fourth Embodiment

In the first embodiment,
in the heating step, the drum accelerates such that the laundry contained in the drum swirls and rotates in step with the rotation of the drum while being in close contact with an inner circumferential surface of the drum and then decelerates such that the laundry separates from the inner circumferential surface of the drum.

Fifth Embodiment

In the first embodiment,
the heating step is followed by a main washing step in which contaminants on the laundry are removed through the rotation of the drum.

Sixth Embodiment

In the fifth embodiment,
a maximum rotation speed of the drum in the heating step is higher than a maximum rotation speed of the drum in the main washing step.

Seventh Embodiment

In the first embodiment,
in the heating step, the rotation of the drum is controlled without depending on the level of the washing water contained in the tub.

Eighth Embodiment

In the first embodiment,
in the heating step, the level of the washing water in the tub and the operation of the induction heater are controlled.

Ninth Embodiment

A ninth embodiment of the present invention is a washing apparatus including: a tub configured to contain washing water;
- a drum rotatably installed in the tub and configured to contain laundry;
- a circulation pump configured to circulate the washing water contained in the tub;
- an induction heater mounted on a surface of the tub and configured to heat the drum by generating a magnetic field; and
- a controller that controls the induction heater to heat the washing water and the laundry, controls the drum such that the drum rotates alternately at a filtration operation speed and at a tumbling operation speed, and controls the circulation pump to circulate the washing water contained in the tub.

Tenth Embodiment

In the ninth embodiment,
the controller controls the drum such that an increase in the rotation speed of the drum and a decrease in the rotation speed of the drum alternately repeat at regular time intervals.

Eleventh Embodiment

An eleventh embodiment of the present invention is a method of controlling a washing apparatus including a tub, a drum, and an induction module mounted on a surface of the tub and configured to heat the drum through electromagnetic induction, the method including:
- a water supply step of supplying washing water into the tub via a water valve; and
- a heating step of heating the washing water by driving the induction module after the water supply step ends,
- in which in the heating step, driving of the drum is interlocked with driving of the induction module, and
- a first period in which the drum operates includes a second period in which the induction module operates, and the induction module does not operate outside the first period in which the drum operates.

Twelfth Embodiment

In the eleventh embodiment,
the drum performs a tumbling operation.

Thirteenth Embodiment

In the eleventh embodiment,
an event of turning on/off the motor for driving/stopping the drum coincides with an event of turning on/off the induction module.

Fourteenth Embodiment

In the eleventh embodiment,
in the heating step, the event of turning on the motor for driving the drum precedes the event of turning on the induction module.

Fifteenth Embodiment

In the fourteenth embodiment,
the induction module is turned on when the drum rotates at a predetermined RPM that is lower than a tumbling RPM after the motor is turned on and the rotation of the drum is accelerated.

Sixteenth Embodiment

In the fourteenth embodiment,
an event of turning off the motor coincides with an event of turning off the induction module.

Seventeenth Embodiment

In the fourteenth embodiment,
an event of turning off the induction module is behind an event of turning off the motor and precedes an event in which the drum stops operating.

Eighteenth Embodiment

In the seventeenth embodiment,
the induction module is turned off when the drum rotates at a predetermined RPM that is lower than a tumbling RPM after the motor is turned off and the rotation of the drum is decelerated.

Nineteenth Embodiment

In the eleventh embodiment,
the washing apparatus further includes a drying temperature sensor sensing the temperature of the drum, and
the induction module is forcibly turned off when the drying temperature sensor senses a temperature that is equal to or higher than a preset temperature rather than being turned off in association with the driving of the drum.

Twentieth Embodiment

In the nineteenth embodiment,
the drum operates multiple times in the heating step.

Twenty-First Embodiment

In the twentieth embodiment,
the washing apparatus further includes a water temperature sensor sensing the temperature of the washing water contained in the tub.

The water temperature sensor is configured to sense the temperature of the washing water when the drum stops operating.

Twenty-Second Embodiment

In the twenty-first embodiment,
the heating step ends when the water temperature sensor senses a preset temperature.

Twenty-Third Embodiment

In one of the eleventh to twenty-second embodiments,
the washing apparatus further includes a circulation pump that pumps up the washing water into the drum from the tub, and
the driving of the drum and the driving of the circulation pump are interlocked.

Twenty-Fourth Embodiment

In the twenty-third embodiment,
an event of turning on/off the motor for driving/stopping the drum coincides with an event of turning on/off the circulation.

Twenty-Fifth Embodiment

In the twenty-fourth embodiment
the heating step is performed in a state in which the level of the washing water is lower than a lower end of the drum.

Twenty-Sixth Embodiment

In the twenty-fifth embodiment,
in the heating step, the level of the washing water is a level formed by an amount of washing water staying in a circulation channel to drive the circulation pump, or a level formed by a smaller amount of washing water than the amount of washing water staying in the circulation channel.

Twenty-Seventh Embodiment

In the twenty-fifth embodiment,
in the heating step, the amount of washing water stored in the tub to form a circulation water level is 1 liter or less.

Twenty-Eighth Embodiment

In the twenty-fifth embodiment,
in the heating step, the drum performs a tumbling operation and a filtration operation.

Twenty-Ninth Embodiment

In the twenty-eighth embodiment,
in the heating step, the drum performs a cyclic operation in which the tumbling operation and the filtration operation seamlessly switch.

Thirtieth Embodiment

In the twenty-ninth embodiment,
in the heating step, the drum performs sequentially and repeatedly the tumbling operation, pausing, and the cyclic operation.

Thirty-First Embodiment

A washing apparatus includes: a tub containing washing water;
a drum rotatably installed in the tub and configured to contain the laundry;
a motor configured to drive the drum;
an induction module mounted on a surface of the tube and configured to heat the drum through electromagnetic induction;
a water valve configured to allow washing water to be introduced into the tub or to block washing water from being introduced into the tub;
a level sensor configured to sense a level of washing water in the tub;
a controller that controls the motor, the induction module, and the water valve.
wherein the controller
controls the motor and the induction module to be turned on and off in an interlocked manner, and
the controller controls the induction module to be driven when the drum rotates at a predetermined speed (RPM) that is lower than a target speed (RPM) after the motor is turned on and the drum accelerates toward the target speed (RPM).

Thirty-Second Embodiment

In the thirty-first embodiment,
wherein the controller
controls the induction module to be turned off when the drum decelerates to reach a predetermined speed (RPM) or lower after the motor is turned off and the drum decelerates to stop.

Thirty-Third Embodiment

In one of the thirty first embodiment or the first second embodiment,
the apparatus further includes a drying temperature sensor that senses the temperature of the drum.
When the temperature sensed by the drying temperature sensor is a predetermined temperature or higher, the controller dissociates the driving of the motor and the driving of the induction module and forcibly stops the operation of the induction module.

Thirty-Fourth Embodiment

In the thirty-third embodiment,
when a time period from a start time to an end time of the motor is preset, and the induction module is forcibly turned off before the preset time period elapses,
the controller controls the motor to be turned off before the preset time period elapses.

Thirty-Fifth Embodiment

In the thirty-fourth embodiment,
the apparatus further includes a circulation pump that pumps the washing water into the drum from the tub, and
the controller controls the motor and the circulation pump such that the driving of the motor is interlocked with the driving of the circulation pump.

Thirty-Sixth Embodiment

A washing apparatus includes: a tub containing washing water;

a drum rotatably installed in the tub and configured to contain the laundry;
a motor configured to drive the drum;
an induction module mounted on a surface of the tube and configured to heat the drum through electromagnetic induction;
a circulation pump that pumps washing water into the drum from the tub;
a water valve configured to allow washing water to be introduced into the tub or to block washing water from being introduced into the tub;
a level sensor configured to sense a level of washing water in the tub;
a controller that controls the motor, the induction module, and the water valve,
wherein the controller
controls the water valve such that washing water is supplied via the water valve until a water level sensed by the level sensor becomes a target level that is lower than a lower end of the drum,
the controller controls the drum and the circulation pump to be driven after the level of the washing water reaches the target level.

INDUSTRIAL APPLICABILITY

It is described in the detailed description of the present invention.

What is claimed is:

1. A method of controlling a washing apparatus including a tub, a drum, an induction module disposed on a surface of the tub and configured to heat the drum through electromagnetic induction, and a circulation pump that pumps washing water into the drum from the tub, the method comprising:
    a water supply step of supplying washing water to the tub via a water valve;
    a soaking step of soaking laundry by driving the drum while circulating the washing water with the circulation pump;
    a heating step of heating the drum by driving the induction module while operating the drum; and
    a main washing step of performing washing by driving the drum after the heating step ends,
    wherein the heating step comprises:
        operating the drum for a time period while driving the induction module and the circulation pump,
        controlling the induction module not to operate outside of the time period of operating the drum, and
        based on detecting that the drum is overheated while operating the drum for the time period, stopping operation of the induction module and maintaining operation of the drum and the circulation pump.

2. The method according to claim 1,
wherein in the water supply step, the washing water is supplied until a water level of the washing water reaches a level at which a lower portion of the drum is immersed in the washing water.

3. The method according to claim 2,
wherein in the water supply step, the washing water is supplied via the water valve multiple times so that the water level rises stepwise.

4. The method according to claim 1,
wherein the soaking step comprises a measuring step of measuring a water level of the washing water, and wherein an additional water supply step is performed when the water level measured in the measuring step is lower than a circulation water level that is preset.

5. The method according to claim 4,
wherein the circulation water level is less than or equal to an amount of washing water required to fill a circulation channel for driving the circulation pump, and the circulation water level is a level where a lower end of the drum is not immersed in the washing water.

6. The method according to claim 5,
wherein the amount of washing water corresponding to the circulation water level is 1.5 liters or smaller.

7. The method according to claim 4,
wherein the additional water supply step is performed until the washing water reaches the circulation water level.

8. The method according to claim 7,
wherein the drum and the circulation pump do not operate in the measuring step and the additional water supply step.

9. The method according to claim 4,
wherein in the soaking step, operation of the drum includes a tumbling operation and a filtration operation.

10. The method according to claim 9,
wherein in the soaking step, the tumbling operation and the filtration operation are sequentially and repeatedly performed.

11. The method according to claim 4,
wherein in the soaking step, the drum performs a cyclic operation in which a tumbling operation is seamlessly followed by a filtration operation.

12. The method according to claim 11,
wherein in the soaking step, the cyclic operation of the drum repeats multiple times, and the cyclic operation is interlocked with the driving of the circulation pump.

13. The method according to claim 12,
wherein an event of turning on a motor for the cyclic operation of the drum coincides with an event of turning on the circulation pump, and an event of turning off the motor for stopping the cyclic operation coincides with an event of turning off the circulation pump.

14. The method according to claim 11,
wherein in the cyclic operation, a time period for the tumbling operation is longer than a time period for the filtration operation.

15. The method according to claim 1,
wherein in the heating step and the main washing step, the washing water is not additionally supplied via the water valve.

16. The method according to claim 1,
wherein the soaking step ends when a water level of the washing water does not change after the drum and the circulation pump are operated.

17. The method according to claim 16,
wherein the soaking step ends when the water level is a circulation water level or below, the circulation water level being less than or equal to an amount of washing water for filling a circulation channel to drive the circulation pump, and
wherein the heating step and the main washing step is performed at the circulation water level.

18. The method according to claim 1,
wherein the washing water in the heating step is a water level at which a lower end of the drum is not immersed in the washing water.

19. The method according to claim 18,
wherein in the heating step, the water level is a circulation water level or below, the circulation water level being less than or equal to an amount of washing water required to fill a circulation channel to drive the circulation pump.

20. The method according to claim 19,
wherein in the heating step, the amount of washing water corresponding to the circulation water level in the tub is equal to or smaller than 1 liter.

21. The method according to claim 18,
wherein in the heating step, the drum, the circulation pump, and the induction module are driven.

22. The method according to claim 21,
wherein the heating step further comprises:
   operating the circulation pump for the time period of operating the drum, and
   controlling the circulation pump not to operate outside of the time period of operating the drum.

23. The method according to claim 21,
wherein in the heating step, a net acting ratio of the drum is 80% or higher.

24. The method according to claim 21,
wherein in the heating step, operation of the drum includes a tumbling operation and a filtration operation.

25. The method according to claim 24,
wherein in the heating step, the drum performs a cyclic operation in which the tumbling operation is followed by the filtration operation seamlessly.

26. The method according to claim 1,
wherein in the soaking step, the drum performs a tumbling operation in a first half of an operation period of the circulation pump and a filtration operation in a second half of the operation period of the circulation pump.

27. The method according to claim 1,
wherein a water level at an end of the water supply step is higher than a water level at an end of the soaking step.

* * * * *